(12) United States Patent
Hartman et al.

(10) Patent No.: US 11,719,370 B1
(45) Date of Patent: Aug. 8, 2023

(54) PIVOTING LOCK FOR DOUBLE LEVER CAM LOCK FITTING

(71) Applicants: Jeffrey Hartman, Mobile, AL (US); George L Williamson, Fairhope, AL (US)

(72) Inventors: Jeffrey Hartman, Mobile, AL (US); George L Williamson, Fairhope, AL (US)

( * ) Notice: Subject to any disclaimer, the term of this patent is extended or adjusted under 35 U.S.C. 154(b) by 0 days.

(21) Appl. No.: 17/856,990

(22) Filed: Jul. 2, 2022

(51) Int. Cl.
*F16L 37/18* (2006.01)

(52) U.S. Cl.
CPC .................................. *F16L 37/18* (2013.01)

(58) Field of Classification Search
CPC . F16L 37/18; F16L 37/20; F16L 37/12; F16L 37/122
USPC ...................................... 285/87–88, 309–311
See application file for complete search history.

(56) References Cited

U.S. PATENT DOCUMENTS

| | | |
|---|---|---|
| 3,017,203 A | 1/1962 | MacLeod |
| 3,124,374 A | 3/1964 | Krapp |
| 3,383,123 A | 5/1968 | Murray |
| 3,439,942 A | 4/1969 | Moore et al. |
| 3,860,274 A | 1/1975 | Ledstrom et al. |
| 4,222,593 A | 9/1980 | Lauffenburger |
| 4,269,215 A | 5/1981 | Odar |
| 4,538,632 A | 9/1985 | Vogl |
| 4,802,694 A | 2/1989 | Vargo |
| 5,234,017 A | 8/1993 | Aslin et al. |
| 5,295,717 A | 3/1994 | Chen |
| 5,338,069 A | 8/1994 | McCarthy |
| 5,435,604 A | 7/1995 | Chen |
| 5,595,217 A | 1/1997 | Gillen et al. |
| 5,791,694 A | 8/1998 | Fahl et al. |
| 5,816,623 A * | 10/1998 | Chang ..................... F16L 37/18 285/309 |
| 5,863,079 A | 1/1999 | Donais et al. |
| 5,904,380 A | 5/1999 | Lee |
| 6,015,168 A | 1/2000 | Fahl |
| 6,047,995 A * | 4/2000 | Kotake ................... F16L 37/18 285/85 |
| 6,095,190 A | 8/2000 | Wilcox et al. |

(Continued)

FOREIGN PATENT DOCUMENTS

WO WO-0037843 A1 * 6/2000 .............. F16L 37/18

*Primary Examiner* — Matthew Troutman
*Assistant Examiner* — Fannie C Kee
(74) *Attorney, Agent, or Firm* — George L Williamson

(57) ABSTRACT

Method and apparatus for an improved camlock fitting having outer/inner cam lever which are restrained against unintended opening or rotation by a pivoting locking member which is pivotally mounted onto an axle disposed in a corresponding hole on the cam levers so that the pivoting locking member can be easily pivoted in the vertical plane relative to the cam arms. Each of the outer and inner arms has a pivoting locking member mounted on its underside in a protective housing. The camlock fitting may also have an air vent. Together this provides a safety lock assembly for the cam lock fitting so that when the cam lock fitting is pressurized unbeknownst to the operator and the operator attempts to open the cam lock fitting, the safety lock assembly will prevent operation or complete separation of the male and the female portions of the fitting to prevent inadvertent pressurized discharge of hazardous materials.

20 Claims, 14 Drawing Sheets

(56) References Cited

U.S. PATENT DOCUMENTS

| | | | |
|---|---|---|---|
| 6,224,113 B1 * | 5/2001 | Chien | F16L 37/18 |
| | | | 285/85 |
| 6,543,812 B1 | 4/2003 | Chang | |
| 7,147,004 B1 | 12/2006 | Hartman | |
| 8,083,265 B1 | 12/2011 | Chen | |
| 8,123,256 B1 | 2/2012 | Hartman | |
| 8,172,271 B2 | 5/2012 | Dixon | |
| 8,632,103 B2 | 1/2014 | Fahie et al. | |
| 8,876,169 B2 | 11/2014 | Chen | |
| 8,955,885 B2 | 2/2015 | Dixon | |
| 9,562,639 B1 | 2/2017 | Hartman | |
| 10,473,248 B2 | 11/2019 | Hartman | |
| 2001/0045745 A1 * | 11/2001 | Collier | F16L 37/18 |
| | | | 285/312 |

* cited by examiner

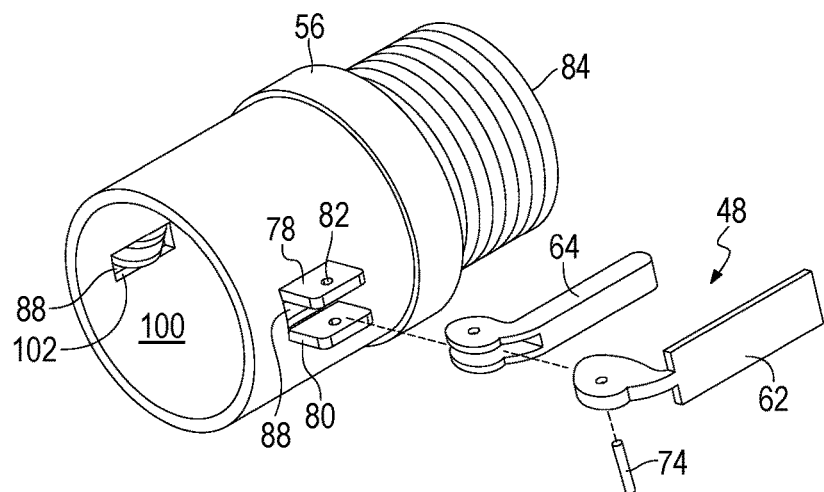
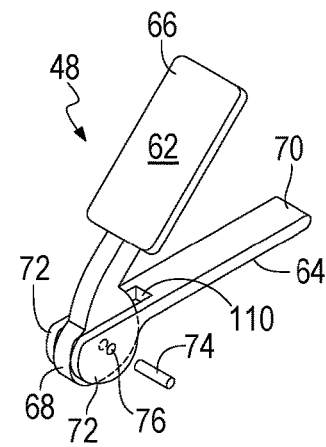
FIG. 4
FIG. 5
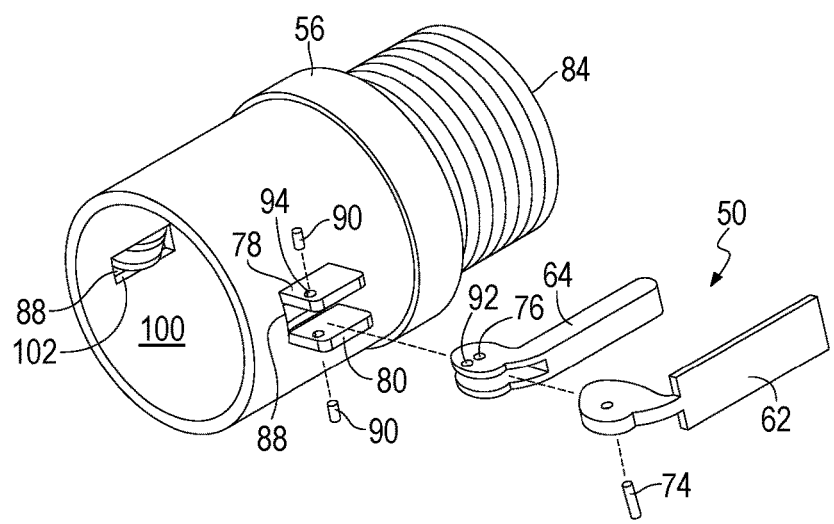
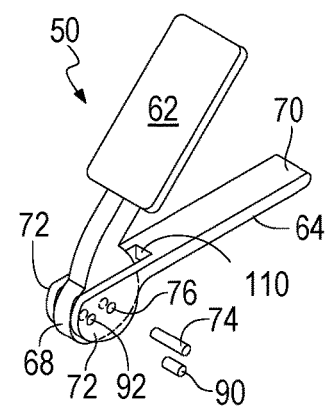
FIG. 6
FIG. 7

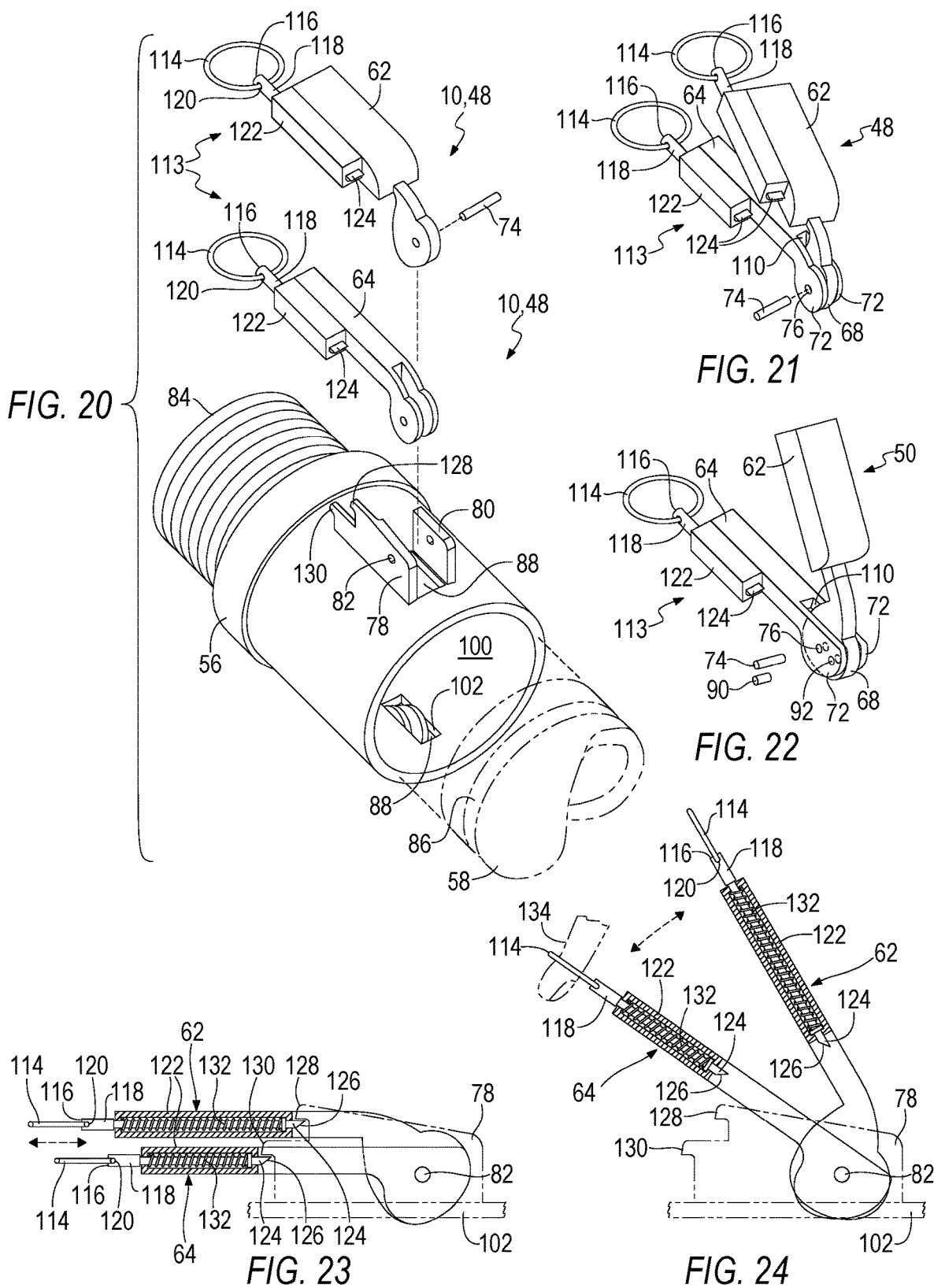

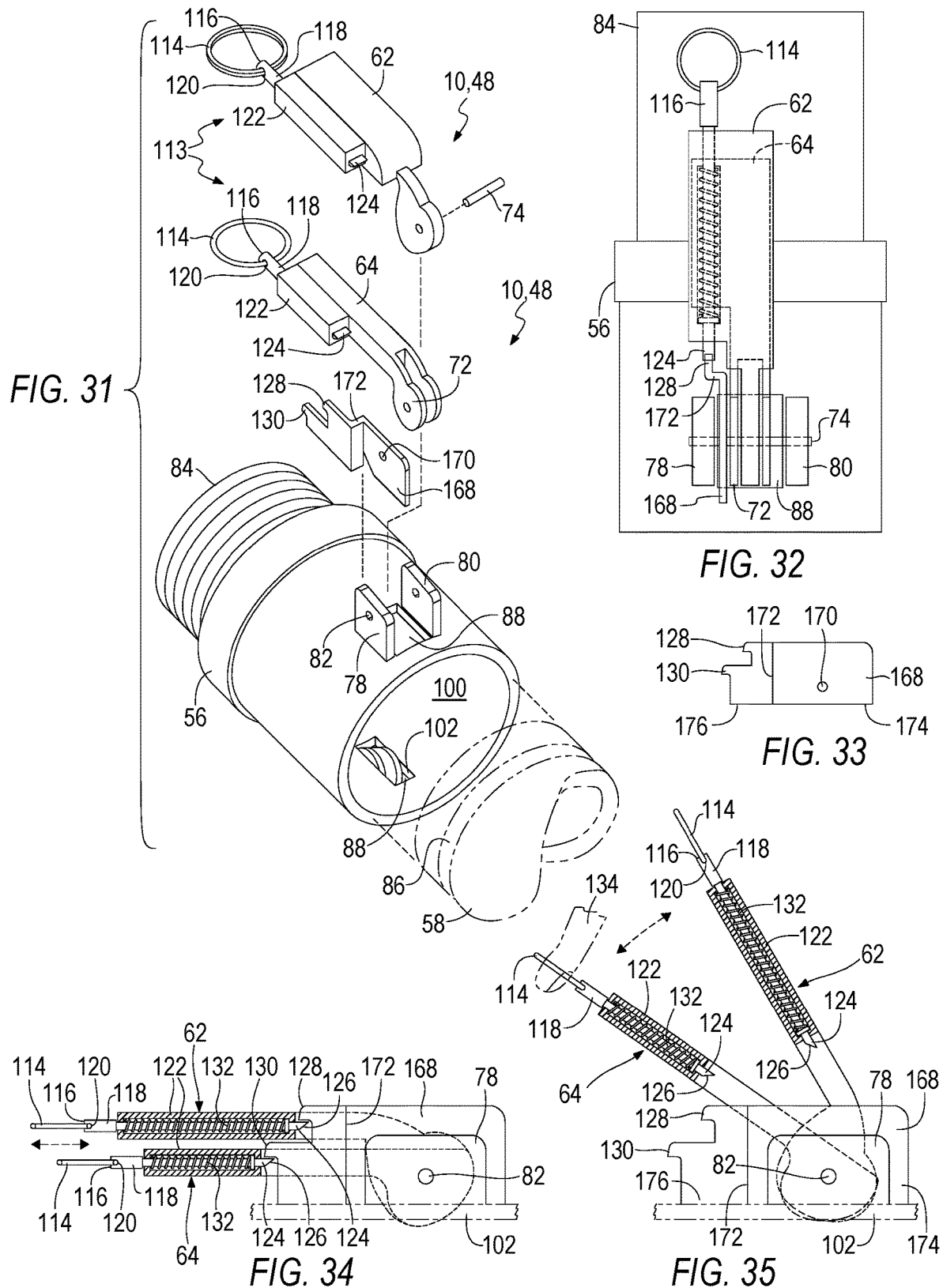

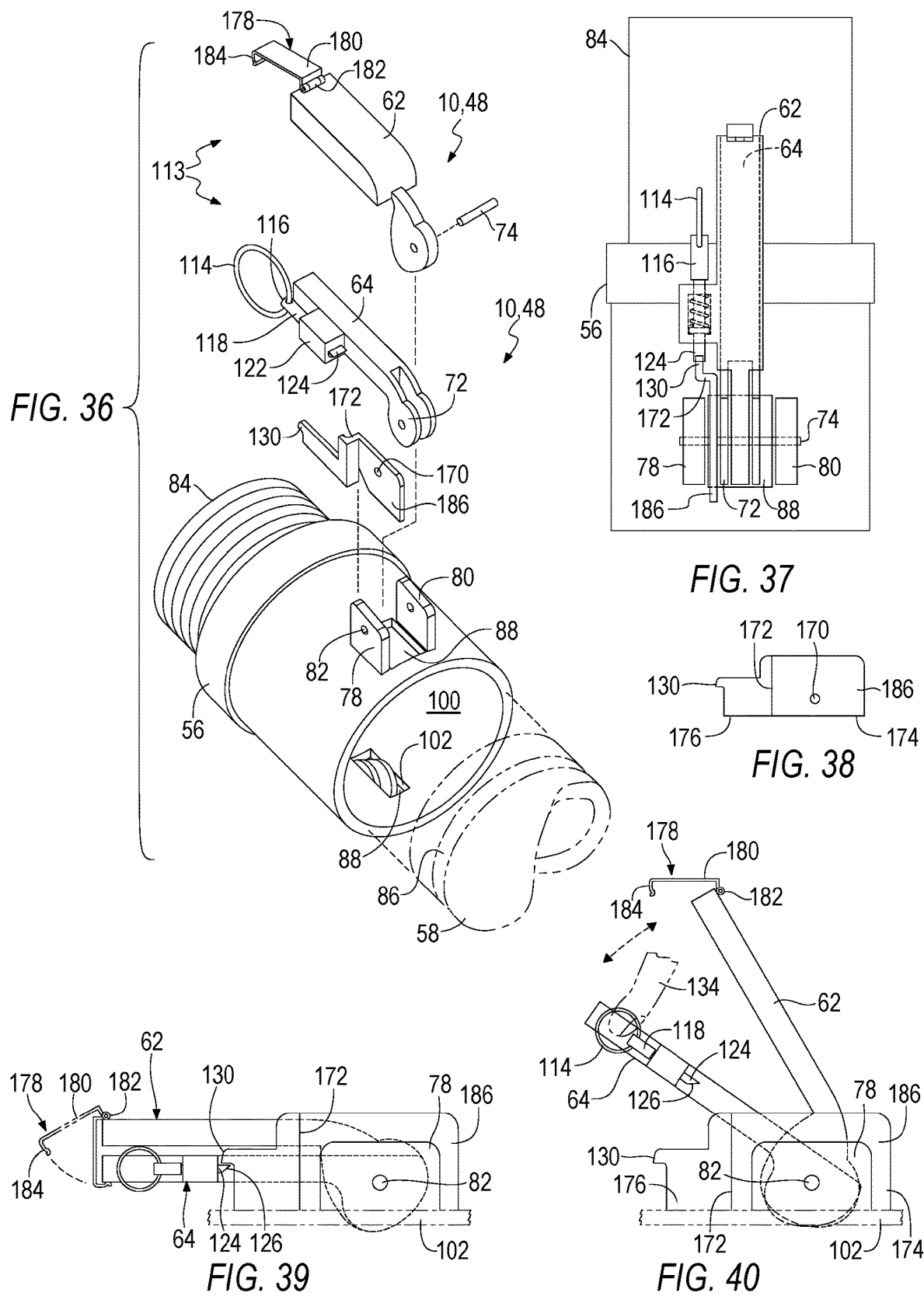

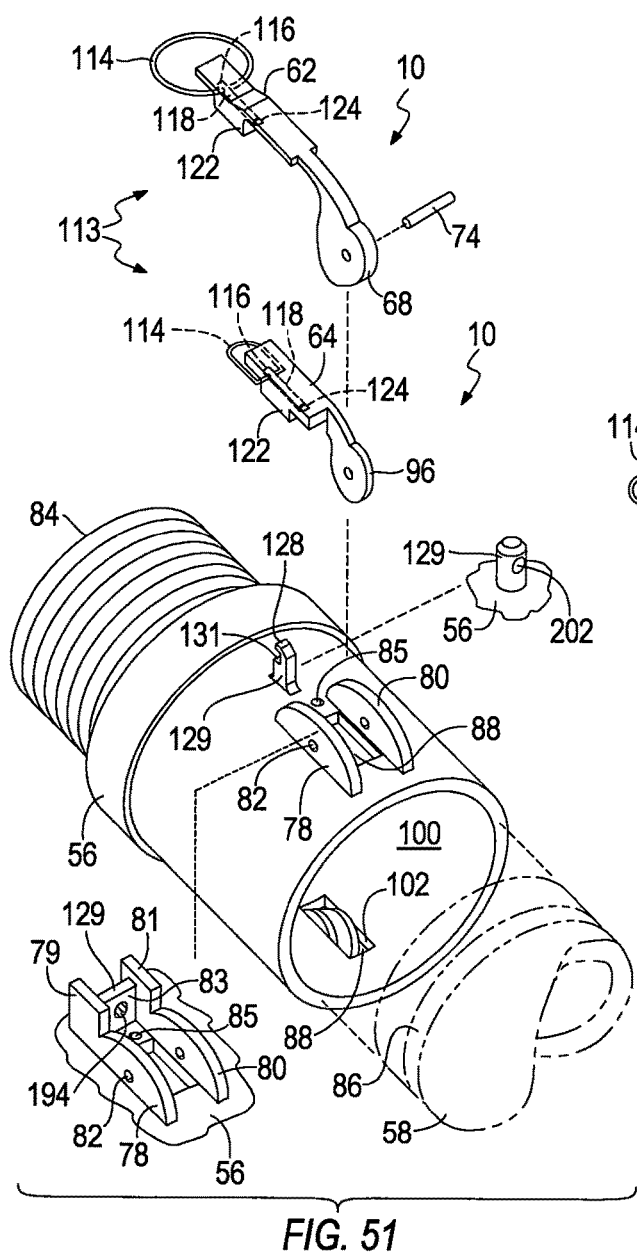
FIG. 51
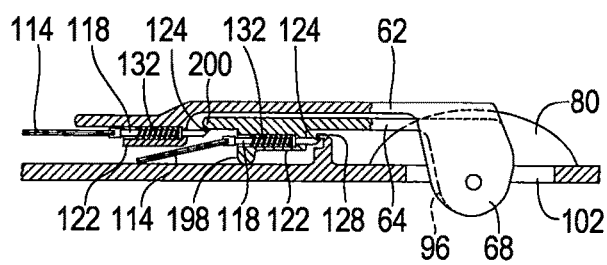
FIG. 55
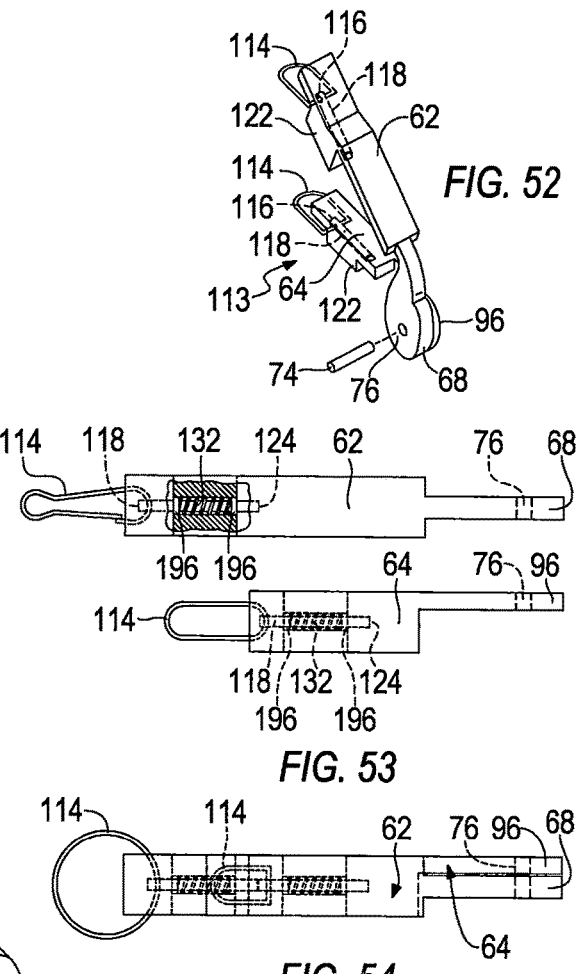
FIG. 52
FIG. 53
FIG. 54
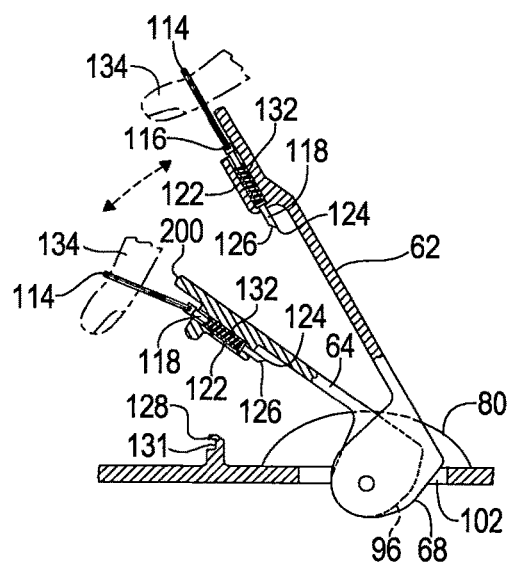
FIG. 56

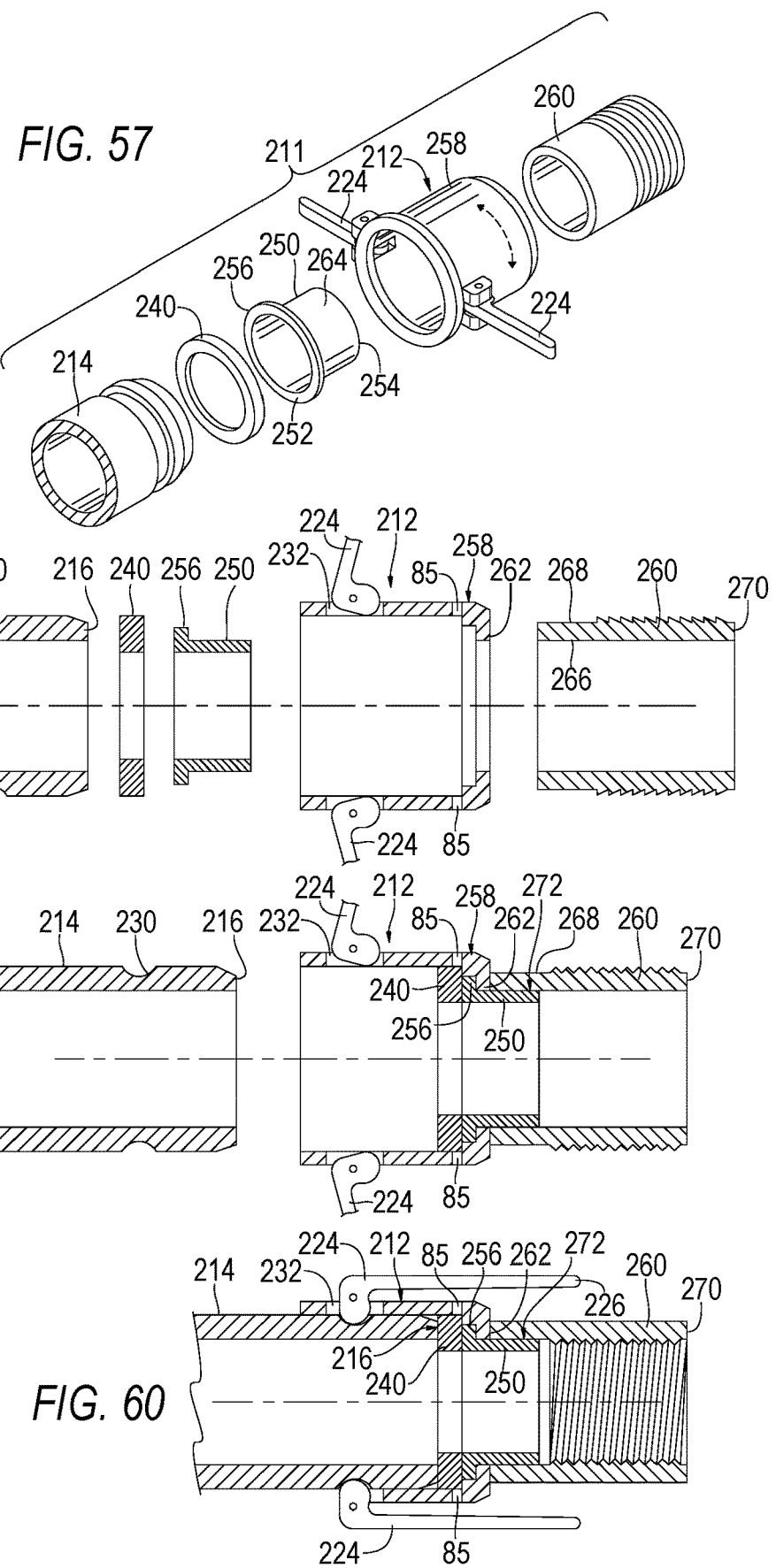

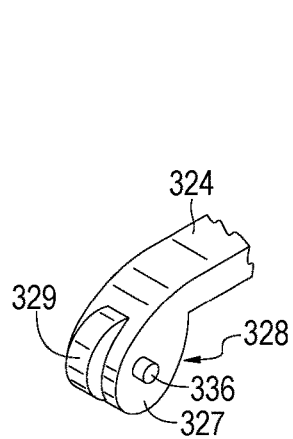
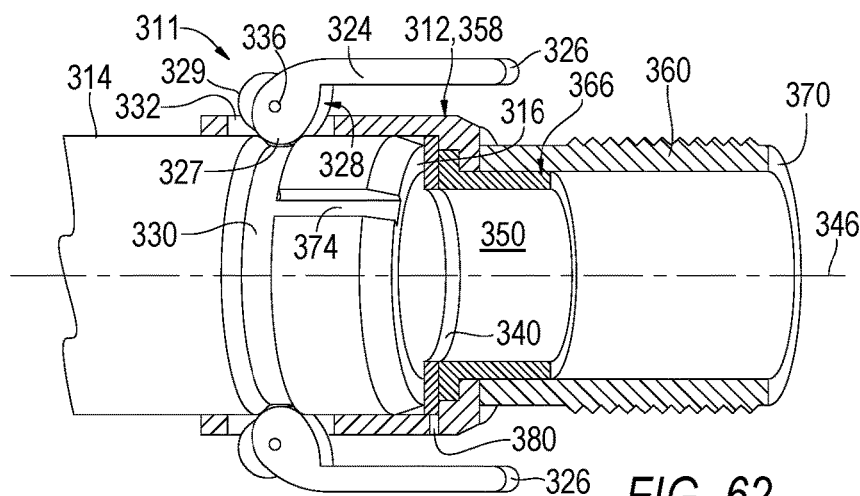
FIG. 65
FIG. 62
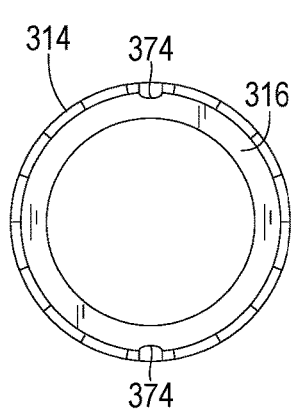
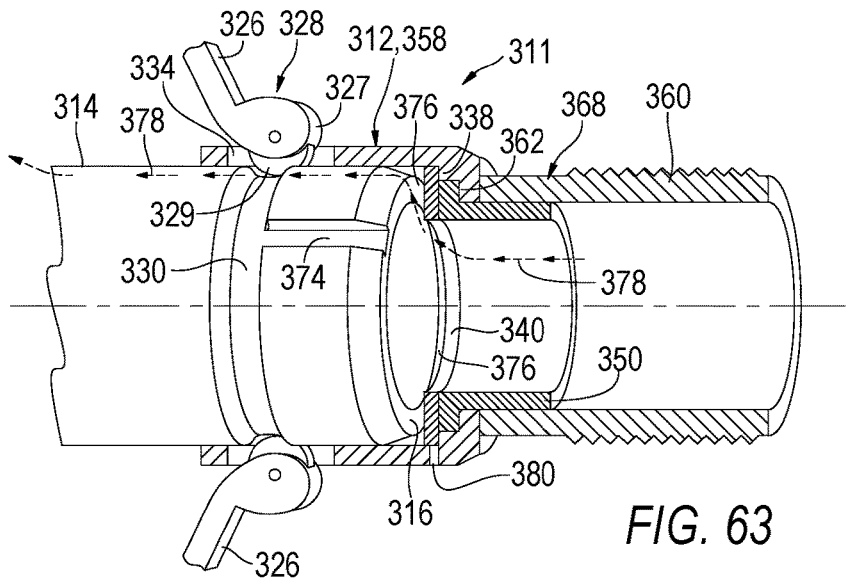
FIG. 66
FIG. 63
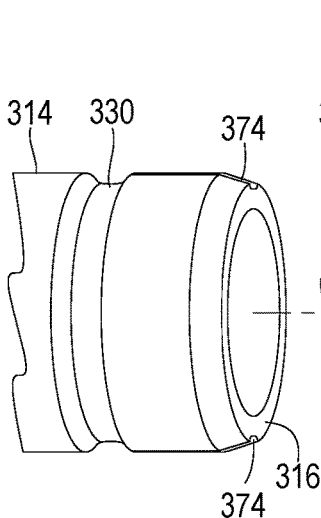
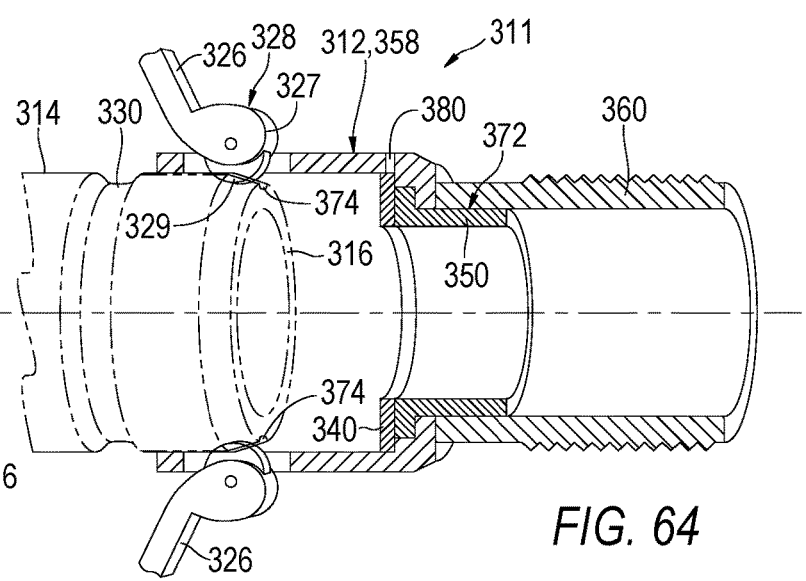
FIG. 64

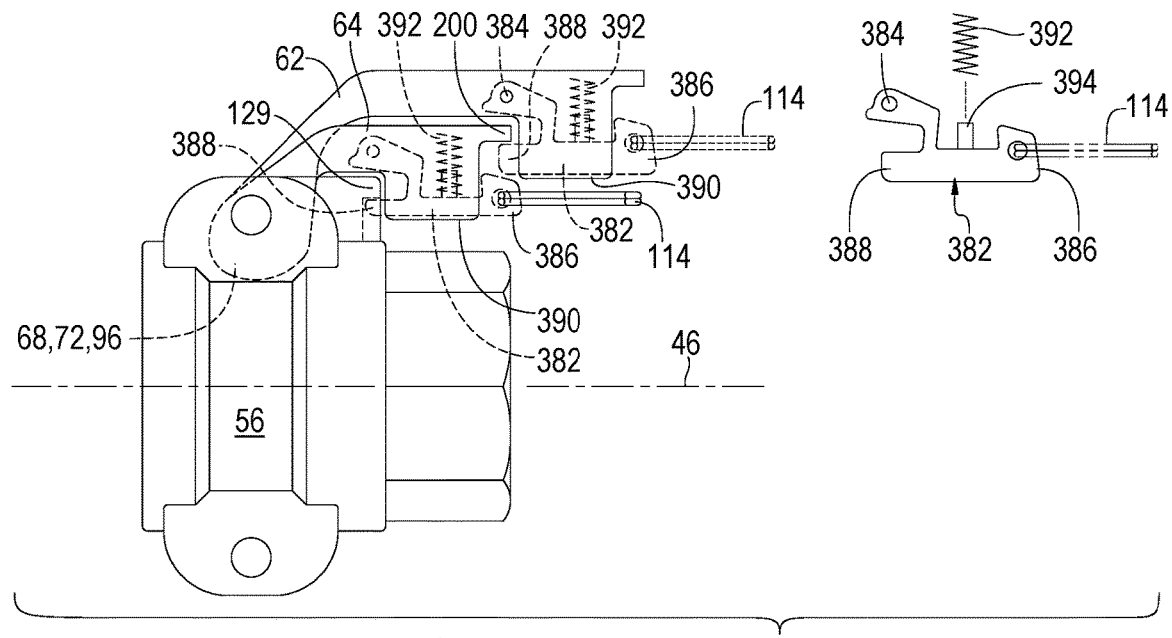
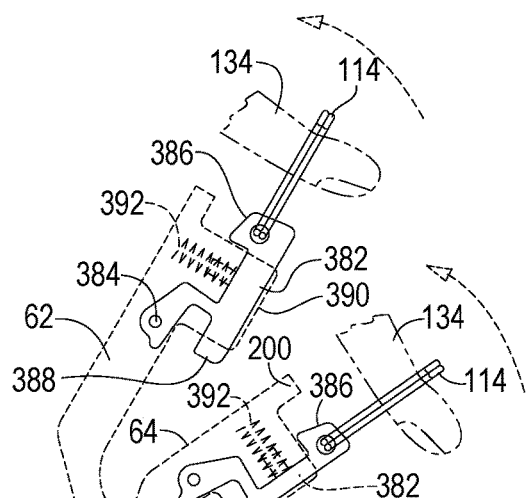
FIG. 67
FIG. 68
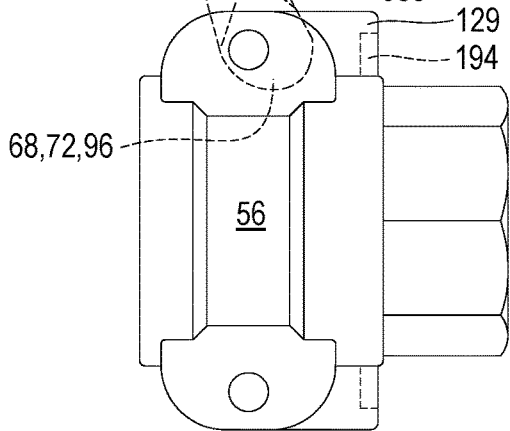
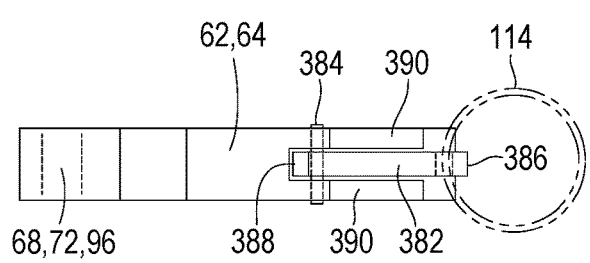
FIG. 69

PIVOTING LOCK FOR DOUBLE LEVER CAM LOCK FITTING

BACKGROUND OF THE INVENTION

Field of the Invention

The present invention relates generally to cam lock fittings and, more particularly, is concerned with a pivoting lock for use with a double lever cam lock fitting.

Description of the Related Art

Cam lock fittings having double cam levers have been described in the related art, and, cam lock fittings having safety features have been described in the related art. However, none of the related art devices disclose the unique features of the present invention.

U.S. Pat. No. 4,802,694 to Vargo, dated Feb. 7, 1989, disclosed a quick-disconnect coupling. However, in use the coupling of Vargo was plagued by the problem that its handles 64, 60 and 74, 68 could be inadvertently opened simultaneously by an operator, thus making it dangerous to use; this occurred because the handles were disposed in side-by-side relation as shown in FIGS. 2 and 4. The present invention overcomes this problem by requiring that the outer handle 62 be opened prior to the inner handle 64. Vargo actually teaches away from the present invention because it relied on springs 50 to retain the safety handles 64, 68 in their locked positions unlike the present invention which has outer and inner handles 62, 64 (See Vargo, Column 9, lines 52-56).

U.S. Pat. No. 8,955,885 to Dixon, dated Feb. 17, 2015, disclosed a hose coupling locking mechanism. U.S. Pat. No. 8,172,271 to Dixon, dated May 8, 2012, disclosed a hose coupling locking mechanism. U.S. Pat. No. 6,543,812 to Chang, dated Apr. 8, 2003, disclosed a self-locking quick release coupler adapted to a groove adapter. U.S. Pat. No. 5,904,380 to Lee, dated May 18, 1999, disclosed a pipe joint. U.S. Pat. No. 5,791,694 to Fahl, et al., dated Aug. 11, 1998, disclosed a lock for coupling cam arms. U.S. Pat. No. 3,439,942 to Moore, et al., dated Apr. 22, 1969, disclosed a retaining member for coupling. U.S. Pat. No. 6,095,190 to Wilcox, et al., dated Aug. 1, 2000, disclosed a coupling with a female half having internal pressure relief. U.S. Pat. No. 5,863,079 to Donais, et al., dated Jan. 26, 1999, disclosed a quick-connect, disconnect coupling. U.S. Pat. No. 5,595,217 to Gillen, et al., dated Jan. 21, 1997, disclosed a dry break coupling assembly with a cam locking connection system. U.S. Pat. No. 5,234,017 to Aflin, et al., dated Aug. 10, 1993, disclosed a restrictor valve for metered liquid dispensing system. U.S. Pat. No. 4,538,632 to Vogl dated Sep. 3, 1985, disclosed a shut-off valve for a fuel truck or tanker drain off having down spouts. U.S. Pat. No. 4,269,215 to Odar dated May 26, 1981, disclosed a vapor flow control valve. U.S. Pat. No. 31,860,274 to Ledstrom, et al., dated Jan. 14, 1975 disclosed a pipe coupling. U.S. Pat. No. 4,222,593 to Laufenburger disclosed a fluid conveying coupling with safety locking device. U.S. Pat. No. 8,123,256 to Hartman dated Feb. 28, 2012 disclosed a safety lock for a cam lock fitting. U.S. Pat. No. 7,147,004 to Hartman dated Dec. 12, 2006 disclosed a check valve for a cam lock fitting. U.S. Pat. No. 3,383,123 to Murray dated May 14, 1968 disclosed a line pressure responsive safety coupling. U.S. Pat. No. 5,338,069 dated Aug. 16, 1994 to McCarthy disclosed a positively locking quick release coupling. U.S. Pat. No. 8,632,103 dated Jan. 21, 2014 to Fahie, et al. disclosed a lock for cam and groove coupler. U.S. Pat. No. 3,124,374 dated Mar. 10, 1964 to Krapp disclosed a self venting separable coupling with lock. U.S. Pat. No. 5,295,717 dated Mar. 22, 1994 to Chen disclosed a tube connecting device that disclosed a lever latching mechanism. U.S. Pat. No. 5,435,604 dated Jul. 25, 2995 to Chen disclosed a tube connecting device that disclosed a lever latching mechanism. U.S. Pat. No. 8,083,265 dated Dec. 27, 2011 to Chen disclosed a tube connecting device that disclosed a lever latching mechanism. U.S. Pat. No. 5,722,697 dated Mar. 3, 1998 to Chen disclosed a fitting with two tubular members rotatable relative to each other. U.S. Patent Application Publication 2011/0095525 dated Apr. 28, 2011 to Eich disclosed a lever arm coupling for connecting hose lines.

While these devices related to cam lock fittings may be suitable for the purposes for which they were designed, they would not be as suitable for the purposes of the present invention, as hereinafter described. As will be shown by way of explanation and drawings, the present invention works in a novel manner and differently from the related art.

SUMMARY OF THE PRESENT INVENTION

The present invention discloses a camlock fitting having outer/inner cam lever which are restrained against unintended opening or rotation by a pivoting locking member which is pivotally mounted onto an axle disposed in a corresponding hole on the cam levers so that the pivoting locking member can be easily pivoted in the vertical plane relative to the cam arms. Each of the outer and inner arms has a pivoting locking member mounted on its underside in a protective housing. The camlock fitting may also have an air vent. Together this provides a safety lock assembly for the cam lock fitting so that when the cam lock fitting is pressurized unbeknownst to the operator and the operator attempts to open the cam lock fitting, the safety lock assembly will prevent operation or complete separation of the male and the female portions of the fitting to prevent inadvertent pressurized discharge of the dangerous materials.

A major problem sought to be solved by the present invention occurs at the time an operator of a conventional prior art cam lock fitting undertakes the operation of opening the fitting; at that time, the operator may not know whether the contents of the conventional fitting are still under pressure, and if the contents are still under pressure the contents will spew out when the conventional fitting is opened possibly resulting in injury to the operator or an unwanted release of materials to the environment. The present invention solves this problem by allowing the improved cam lock fitting to be only partially opened by means of a safety lock feature which allows the improved fitting to be reclosed if the operator observes that the contents inside the improved fitting remain pressurized.

An object of the present invention is to provide a cam lock fitting having a pair of cooperating double cam lock levers thereon. A further object of the present invention is to provide a safety lock which can be easily operated by a user as a part of the normal operation of a cam lock fitting. A further object of the present invention is to provide a safety lock which will remain locked when the cam lock fitting is pressurized. A further object of the present invention is to provide a safety lock on a cam lock fitting which will prevent inadvertent pressurized discharges of environmentally damaging material from the cam lock fitting. A further object of the present invention is to provide a safety lock on a cam lock fitting which is simply constructed and which can be relatively inexpensively manufactured. A further object of the present invention is to provide a cam lock fitting having a pair of cooperating double cam lock levers having a lever latching mechanism thereon. A further object of the present invention is to provide a cam lock fitting which is rotatable and having an air vent thereon.

A major advantage of the present invention is that neither the inner or outer levers can be opened by pulling on the corresponding pull ring in a direction merely parallel to the centerline of the female conduit. Another major advantage of the preset invention is that the cam members are disposed substantially 180 degrees apart and therefore all forces related to associated stress or torque resulting from using the cam members are evenly distributed around a cam lock fitting designed according to the teachings of the present invention. Conventional cam lock fittings using side-by-side cam members would not be expected to exhibit this characteristic.

The foregoing and other objects and advantages will appear from the description to follow. In the description, reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 4 is an exploded perspective view of a first embodiment of the present invention.

FIG. 5 is a perspective view of the double cam lever of a first embodiment of the present invention.

FIG. 6 is an exploded perspective view of a second embodiment of the present invention.

FIG. 7 is a perspective view of the double cam lever of a second embodiment of the present invention.

FIG. 20 is an exploded perspective view of a lever latching embodiment of the present invention.

FIG. 21 is a perspective view of a lever latching embodiment of the present invention.

FIG. 22 is a perspective view of an alternative lever latching embodiment of the present invention.

FIGS. 23-24 are side elevation views of a lever latching embodiment of the present invention with certain parts shown cut-away for ease of illustration.

FIG. 31 is an exploded perspective view of an alternative embodiment of a lever latching mechanism of the present invention.

FIG. 32 is a top view of an alternative embodiment of a lever latching mechanism of the present invention.

FIG. 33 is a side elevation view of a plate of an alternative embodiment of a lever latching mechanism of the present invention.

FIGS. 34-35 are side elevation views of an alternative embodiment of a lever latching mechanism of the present invention with certain parts shown cut-away for ease of illustration.

FIG. 36 is an exploded perspective view of an alternative embodiment of a lever latching mechanism of the present invention.

FIG. 37 is a top view of an alternative embodiment of a lever latching mechanism of the present invention.

FIG. 38 is a side elevation view of a plate of an alternative embodiment of a lever latching mechanism of the present invention.

FIGS. 39-40 are side elevation views of an alternative embodiment of a lever latching mechanism of the present invention.

FIG. 51 is an exploded perspective view of an alternative lever latching embodiment of the present invention.

FIG. 52 is a perspective view of an alternative lever latching embodiment of the present invention.

FIG. 53 is a top view of each lever of an alternative lever latching embodiment of the present invention.

FIG. 54 is a top view of an alternative lever latching embodiment of the present invention showing the levers in an assembled disposition.

FIG. 55 is a side elevation view of an alternative lever latching embodiment of the present invention shown in a closed position with certain parts shown cut-away for ease of illustration.

FIG. 56 is a side elevation view of an alternative lever latching embodiment of the present invention shown in an open position with certain parts shown cut-away for ease of illustration.

FIG. 57 is an exploded perspective view of an alternative embodiment of the present invention.

FIGS. 58-60 are sectional views showing the steps of operating and assembling an alternative embodiment of the present invention with certain parts shown in elevation for ease of illustration.

FIGS. 62-64 are sectional views of an alternative embodiment of the present invention with certain parts shown in perspective for ease of illustration.

FIG. 65 is a perspective view of the cam lobe of an alternative embodiment of the present invention.

FIG. 66 is an end elevation view of portions of an alternative embodiment of the present invention.

FIG. 67 is a side elevation view of an alternative embodiment of the present invention in a closed position showing certain portions broken away for ease of illustration.

FIG. 68 is a side elevation view of an alternative embodiment of the present invention in a partially opened position.

FIG. 69 is a bottom plan view of portions of an alternative embodiment of the present invention.

REFERENCE NUMERALS

Figure 1:
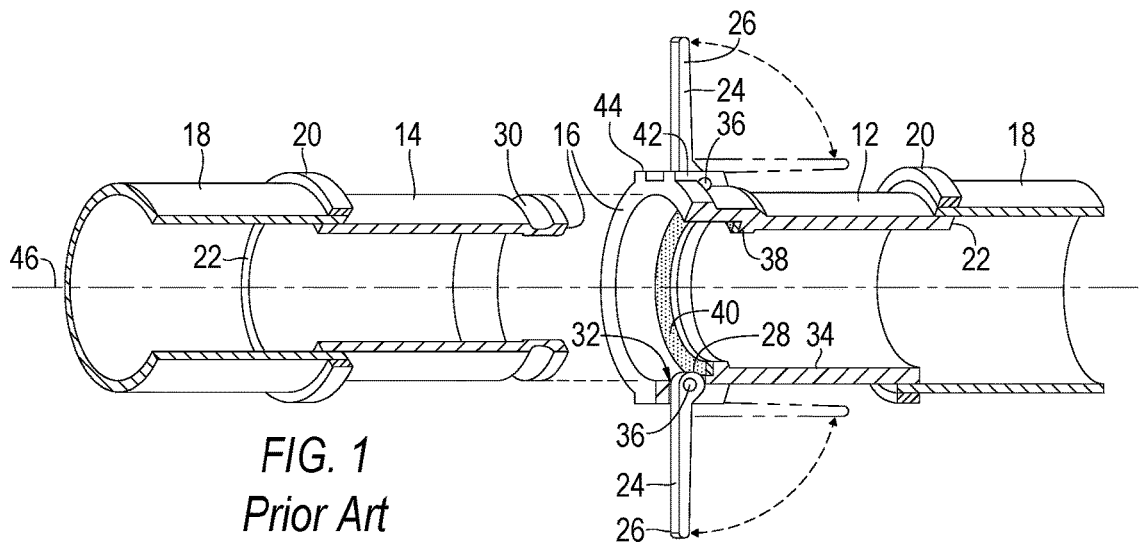
FIG. 1 is a perspective view of a prior art cam lock fitting.

With regard to reference numerals used, the following numbering is used throughout the drawings.

10 prior art cam lock fitting
12 female end portion
14 male end portion
16 front end
18 hose
20 band clamp
22 rear end
24 cam lever/ear
26 lever portion
28 cam portion
30 groove
32 opening
34 wall of cam lock fitting
36 axle
38 flange
40 gasket
42 boss
44 boss
46 centerline
48 an alternative double lever cam lock
50 an alternative double lever cam lock
52 an alternative double lever cam lock
54 cam lock fitting
56 female end portion/conduit
58 male end portion/conduit
60 front end
62 outer cam lever/ear
64 inner cam lever/ear
66 lever portion
68 cam lobe portion
70 lever portion
72 cam lobe portion
74 axle
76 aperture of cam lobe
78 boss
79 sidewall
80 boss
81 sidewall
82 aperture of boss
83 cross member
84 rear end
85 vent hole
86 groove
87 longitudinal slot
88 opening
90 axle
92 aperture
94 aperture
96 cam lobe portion
98 circular gasket/seal
100 inside
102 wall
104 flange
106 space
108 arrow/discharge
110 cutout/space
112 rear portion
113 lever latching mechanism or lock assembly
114 pull ring member
116 end of pin
118 pin
120 aperture of pin
122 housing for pin
124 tip end of pin
126 inclined surface of pin
128 retaining protrusion
129 latch body/retaining member
130 retaining protrusion
131 notch
132 spring biasing member
134 finger of user
136 space
138 alternative embodiment double lever cam lock
140 alternative embodiment double lever cam lock
142 larger cam member with larger arm
144 smaller cam member with smaller arm
146 cylindrical spacer
147 latch mechanism or lock assembly
148 latch lever/arm
150 pivot
152 spring biasing means
154 thumb grip
156 first catch for outer ear
158 second catch for inner ear
160 cam member
162 cam member
164 boss
166 mount
168 plate
170 aperture of plate 172 offset
174 front inner surface
176 rear inner surface
178 latch mechanism or lock assembly
180 latch member/clip
182 pivot
184 clamp portion
186 plate
188 slot for ring
190 length
192 width
193 shield/hand guard
194 aperture
196 collar bushing/bushing
198 spacer
200 rear lip of inner cam lever
202 aperture
211 cam lock fitting of the present invention
212 female end portion
214 male end portion
216 front end
224 cam lever/ear/arm
226 lever portion
230 groove
232 opening
240 gasket
250 connecting collar
252 front end of connecting collar
254 rear end of connecting collar
256 outer flange
258 front section of female end portion
260 tail section of female end portion
262 inner flange
264 outer surface of connecting collar
266 interior surface of tail section
268 front end portion of tail section
270 rear end portion of tail section
272 press fit portion
311 cam lock fitting of the present invention
312 female end portion
314 male end portion
316 front end
324 cam lever/ear
326 lever portion
327 larger cam lobe portion
328 cam portion
329 smaller cam lobe portion
330 groove
332 opening
334 wall of cam lock fitting
336 axle
338 flange
340 gasket
346 centerline
350 connecting collar
352 front end of connecting collar
354 rear end of connecting collar
356 outer flange
358 front section of female end portion
360 tail section of female end portion
362 inner flange
364 outer surface of connection collar
366 interior surface of tail section
368 front end portion of tail section
370 rear end portion of tail section
372 press fit portion
374 notch 376 space
378 arrows
380 vent hole
382 pivoting locking member
384 axle
386 rear end of pivoting locking member
388 front tip of pivoting locking member
390 protective housing
392 biasing member
394 protrusion

DETAILED DESCRIPTION OF THE PREFERRED EMBODIMENT

The following discussion describes in detail at least one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims. FIGS. 1-69 illustrate the present invention wherein a cam lock fitting having a pivoting locking member is disclosed.

Turning to FIG. 1, therein is shown a prior art version of a conventional cam lock fitting generally indicated by reference number 10 having a female end coupling portion or conduit 12 and a male end coupling portion or conduit 14 each having a front end 16 which when joined together form a conduit through which fluid or the like will flow. A hose 18 having a band clamp 20 thereon is attached to a rear end 22 of each female 12 and male 14 portions; hose 18 ranges in size from about one inch to about 8 inches and are generally heavy for accommodating relatively high pressure. The female portion 12 has a pair of cam levers or ears 24 each having a lever portion 26 and a cam portion 28 thereon, which cam portion locks the female end 12 to the male end 14 by seating the cam portion 28 of the female portion within a peripheral groove 30 on an exterior of the male portion so that the two portions 12, 14 with hoses 18 are joined together to form a conduit so that materials can pass therethrough. The cam portion 28 projects through an opening 32 in the wall 34 near the front end 16 of the female portion 12 as the ears 24 pivot on axles 36. Direction arrows are used to show movement of ears 24 between a closed position lying substantially parallel to and adjacent the female portion 12 and an open position outwardly moved away from the female portion 12 so as to disengage the cam portion from groove 30. Also shown on the inside of the female portion 12 is annular flange 38 having a flexible circular gasket or O-ring seal 40 therein, wherein the flange and gasket extend entirely around the internal periphery of the female portion for making sealing contact with the end 16 of the male end portion 14 in a conventional manner. One skilled in the art would understand that gasket 40 is carried in a gasket seat and that the flange 38 forms the rear wall of the gasket seat so that the gasket seat has a rear wall portion formed by flange 38 and an outer periphery portion formed on the inner surface of wall 34. The ears 24 are each mounted onto an axle 36 extending through first, left and second, right bosses 42, 44 disposed on opposite sides of the female coupling 12. Centerline 46 of cam lock fitting 10 is also shown. A major disadvantage of the prior art cam lock fitting 10 is that it is designed to be either completely closed or completely open and therefore offers no safety locking mechanism.

Figure 2:
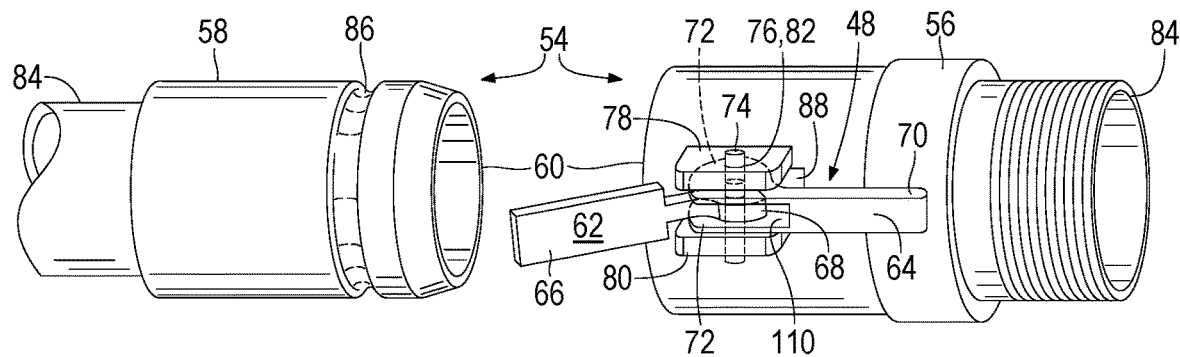
FIG. 2 is a perspective view of a first embodiment of the present invention.
Figure 3:
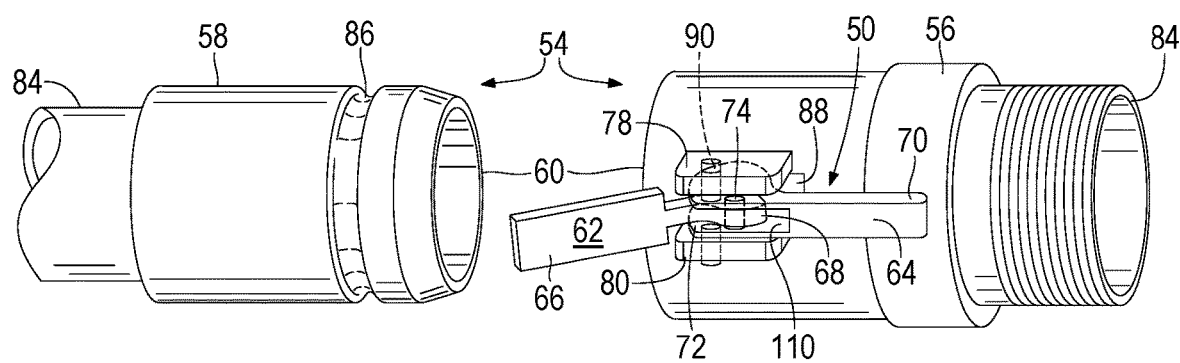
FIG. 3 is a perspective view of a second embodiment of the present invention.
Figure 41:
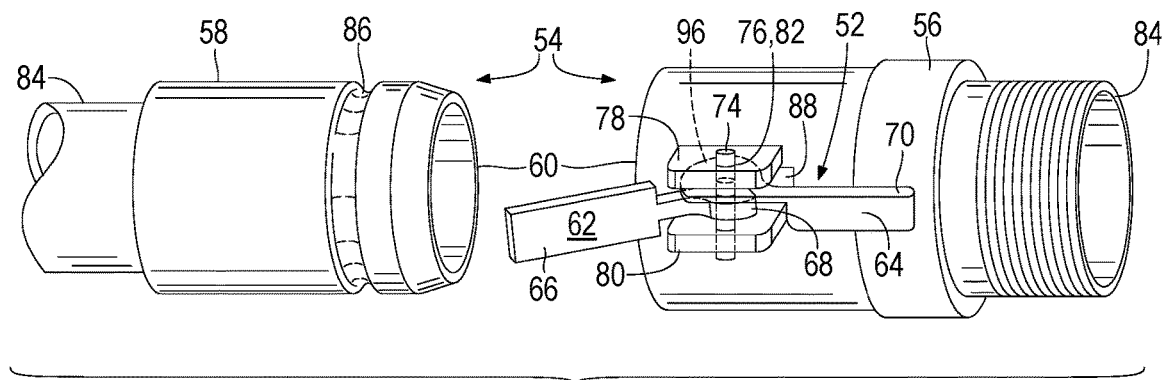
FIG. 41 is a perspective view of a third embodiment of the present invention.

Turning to FIGS. 2-3 and FIG. 41, therein are shown three embodiments 48, 50, 52 of an improved cam lock fitting 54 of the present invention wherein FIG. 2 shows embodiment 48; FIG. 3 shows embodiment 50; and FIG. 41 shows embodiment 52. FIGS. 2-3 and FIG. 41 show a cam lock fitting 54 similar in some respects to the prior art cam lock fitting 10, shown in FIG. 1, but with important differences due to the embodiments 48, 50, 52 mounted thereon. Therein is shown a cam lock fitting 54 having a female end coupling portion or conduit 56 and a male end coupling portion or conduit 58 each having a front end 60 which when joined together form a conduit through which fluid or the like will flow. The present invention operates similarly to the prior art am lock fitting 10 shown in FIG. 1 except that there are a total of four cam levers (i.e., two pairs of double cam levers/ears) instead of two cam levers wherein the double cam levers cooperate with each other to provide a safety lock. Each of the cam lock fittings 54 shown in FIGS. 2-3 and FIG. 41 are similar to each other, however, different embodiments 48, 50, 52 of cam lock levers are mounted thereon.

Figure 18:
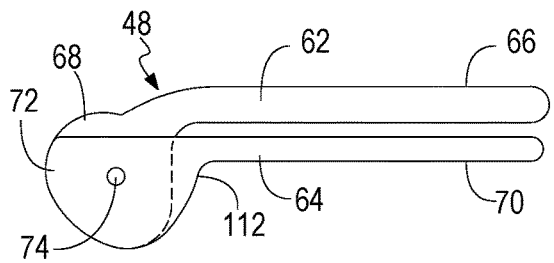
FIG. 18 is a side elevation view of the double cam lever of an alternative embodiment of the present invention.

Turning to FIG. 2, therein is shown the embodiment 48 having a pair of double cam levers or members 62, 64 mounted on opposite sides of the female end portion 56 wherein each pair has an outer cam lever 62 and an inner cam lever 64. Outer cam lever 62 has a lever portion 66 and an eccentric cam lobe portion 68, and, inner cam lever 64 also has a lever portion 70 and first and second eccentric cam lobe portion 72 wherein the first and second cam lobe portions form the two prongs of a fork shaped portion being spaced apart a distance thereby creating a cutout or space 110 sufficient to allow the cam lobe portion 68 to fit therein between the two prongs which causes the inner and outer cam levers 62, 64 to be disposed symmetrically about the female end portion 56 which assures smooth operation throughout the life span of a cam lock fitting 54 made according to the teachings of the present invention. The cam lobe portion 72 resembles a fork shape when viewed from the top (see FIG. 19) wherein the two similar first and second prongs/branches of the fork have cam lobe 68 disposed therein between in space 110; of course, the positions of the lobes 68, 72 could be reversed relative to each other wherein the larger lobe portion 68 could be manufactured as the forked portion 72 so that the smaller lobe portion would be disposed on the inside of the larger forked portion as shown in FIG. 18. The lever portion 66 of the outer cam ear 62 is larger, i.e., wider, than the lever portion 70 of the inner cam ear 64 so that it will be easier to grasp in the hands of an operator; also, the inner cam ear is not intended to be opened until after the outer cam ear is opened and having a wider outer ear helps accomplish this objective. A lever latching mechanism 113 for use with lever 62, 64 is described in FIGS. 20-24.

A single axle 74 passes through a substantially centrally disposed aperture 76 of cam lobe portion 68, 72 and the ends of the axle are carried on first and second bosses 78, 80 by passing through an aperture 82 of each boss. The male and female end portion 56, 58 each have a rear end portion 84 and the male end portion has an external peripheral groove 86 thereon. The female end portion 56 has openings 88 in the opposing walls thereof through which cam lobes 68, 72 pass. Cam lobe portion 68 of outer cam ear 62 is configured differently and may be larger than cam lobe portion 72 of inner cam ear 64, as best shown on FIGS. 8-10 and FIG. 16, so that when the outer and inner ears 62, 64 are closed the cam lobe portion 68 fits in or engages groove 86 so as to completely sealingly close or connect the male end portion 58 to the female end portion 56 because cam lobe 68 is substantially the same size and shape of the groove 86. This is due to cam lobe 68 being effectively configured, in size or shape, so as to engage groove 86 in such a way to cause the end 60 of male end conduit 58 to move axially into a sealing position relative to the sealing gasket inside female conduit 56. In contrast, when the outer cam ear 62 with cam lobe 68 is opened and the smaller cam lobe 72 is unopened, the male end portion 58 becomes slightly loosened or separated from the female end portion 56 to allow a space to form between the front end 60 of the male end portion 58 and the female end portion 56 as best shown and explained relative to FIGS. 8-13, because smaller cam lobe 72 being smaller, i.e., being configured differently, than groove 86 doesn't completely fill groove 86 being loose fit thereby causing a slight space to form between front end 60 and the female end portion 56 as previously disclosed.

In summary of FIGS. 2-3 and FIG. 41, the female portion 56 has a pair of double cam levers or ears 48, each having an outer and inner lever portion 66, 70 and a cam portion 68, 72 thereon, which cam portion locks the female end 56 to the male end 58 by seating the cam portions 68, 72 of the female portion within a groove 86 on the male portion so that the two portions are joined together. The cam portions 62, 64 project through an opening 88 in the wall near the end 60 of the female portion 56 as the ears 62, 64 pivot on axle 74. Also included in the female portion 56 is a gasket or O-ring seal 98 therein wherein the gasket extends entirely around the internal periphery of the female portion for making sealing contact with the end 60 of the male end portion 58 in a conventional manner as shown in FIGS. 8-13 and 45-47. The ears 62, 64 are each mounted onto an axle 74 extending through a first and second boss 78, 80 mounted on opposite sides of female coupling 56. The inner and outer ears 62, 64 each move between a first downward closed position lying substantially parallel to and adjacent the female portion 56 to a second upward open position outwardly moved away from the female portion so as to disengage the cam portion 68, 72 from groove 86.

In order for an operator to open a cam lock fitting 54 designed according to the teachings of the present invention, the operator must first move the outer cam lever 62 from the first downward closed position to the second upward open position so that larger cam lobe 68 is moved away from groove 86 so as to partially open the cam lock fitting 54 so as to partially relieve internal pressure contained inside the cam lock fitting. If there is no pressure remaining in the cam lock fitting 54 the operator can continue with the next step of opening the second inner cam lever 64 to thereby separate the male and female conduit portions 58, 56 just as previously explained relative to embodiment 48 of FIG. 2. However, if there is still pressure inside the cam lock fitting 54 when the first outer cam lever 62 is opened, the operator will immediately reclose that first outer cam lever 62 so as to pull the male end portion 58 back into the locked position inside female end portion 56 so as to reclose and reseal the cam lock fitting. Pressure remaining inside cam lock fitting 54 could be indicated by the sound of escaping gas, a hissing sound, seepage, leaking or gurgling liquid or the like.

Turning to FIG. 3, therein is shown a view similar to FIG. 2 except that another embodiment 50 of the double cam lever is shown having double axles 74, 90. The female and male end portions 56, 58 are essentially the same as shown in FIG. 2 with the main difference being that inner cam ear 64 is mounted onto bosses 78, 80 using axle 90 in aperture 92 which axle 90 is offset from the center of lobe 72 toward the front end 60 of the female end portion 56 so as to be disposed toward the front ends of bosses 78, 80 so in aperture 94 as best shown on FIGS. 6-7. Axle 90 and apertures 92,94 are co-aligned as shown in FIG. 6. In this configuration, while outer cam ear 62 pivots on substantially centrally disposed axle 74 on cam lobe 72, it is carried with and moves outwardly with inner cam ear 64 by having cam lobe portion 72 pivot on offset axle 90 which is better illustrated in FIGS. 6-7 and 11-13. The operation of embodiment 50 is similar to embodiment 48 and the steps of operation have been previously disclosed relative to embodiment 48 of FIG. 2.

Figure 42:
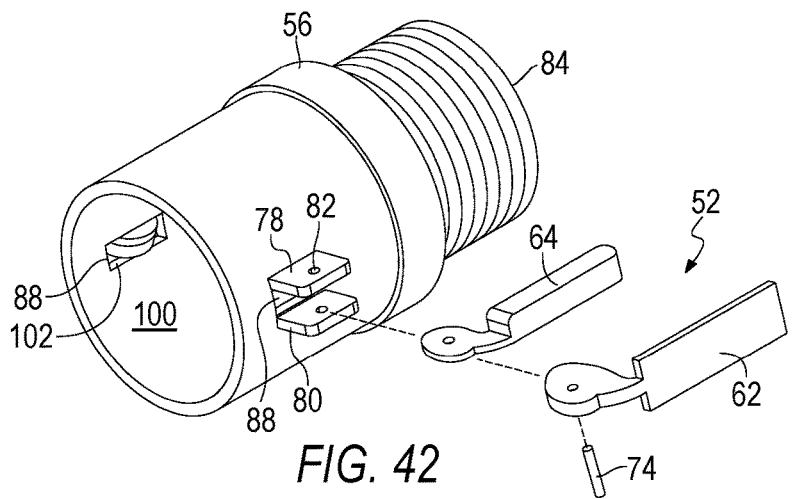
FIG. 42 is an exploded perspective view of a third embodiment of the present invention.

Turning to FIGS. 4, 6, and 42 the three embodiments 48, 50, 52 of an improved cam lock fitting of the present invention are exploded away from a female end portion 56; wherein FIG. 4 shows embodiment 48, FIG. 6 shows embodiment 50, and FIG. 42 shows embodiment 52. Shown therein is the inside 100 of the female coupling 56 along with the alternative double cam levers 48, 50, 52 on opposite sides of the female end portion 56 showing the bosses 78, 80 on the female coupling 56. Note that the openings 88 are sized and shaped to accommodate movement of the cam lobes of the present invention. The bosses 78, 80 are attached onto the outside of the female coupling 56 in the conventional manner. Previously disclosed elements are also shown as were discussed relative to the respective embodiments 48, 50, 52 of FIGS. 2-3 and FIG. 41.

Figure 43:
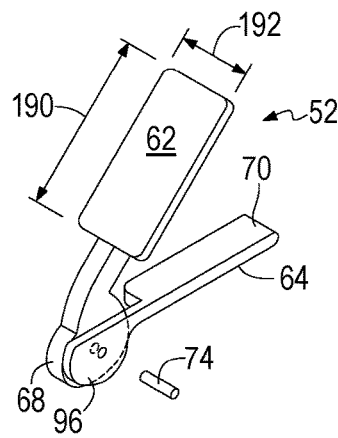
FIG. 43 is a perspective view of the double cam lever of a third embodiment of the present invention.

Turning to FIGS. 5, 7, and 43 an enlarged view of the cam portions of the three embodiments 48, 50, 52 are shown illustrating the features of the two embodiments as previously disclosed relative to the respective embodiments 48, 50, 52 of FIGS. 2-3 and FIG. 41. FIG. 5 shows single axle embodiment 48, FIG. 7 shows a double axle embodiment 50 and FIG. 43 shows embodiment 52. FIG. 43 also shows dimension lines for length 190 and width 192 on outer cam lever 62 and it is expected that the length and width of the outer cam lever 62 will be an effective amount greater than the length and width of the corresponding portions of inner cam lever 64 causing outer cam lever 62 to have a greater surface area than inner cam lever 64 to assist in preventing inner cam lever 64 from being inadvertently opened before outer cam lever 62 and to prevent cam levers 62, 64 from being inadvertently opened together and to insure that the fingers or hand of a user grasp outer cam lever 62 first to be sure it is opened prior to underlying inner cam lever 64. The neck area/portion of outer cam lever 62 may also be longer than the neck area/portion of the inner cam lever 64 as disclosed relative to other previously disclosed embodiments. Previously disclosed elements are also shown as were discussed relative to the respective embodiments 48, 50, 52 of FIGS. 2-3 and FIG. 41.

Figure 8:
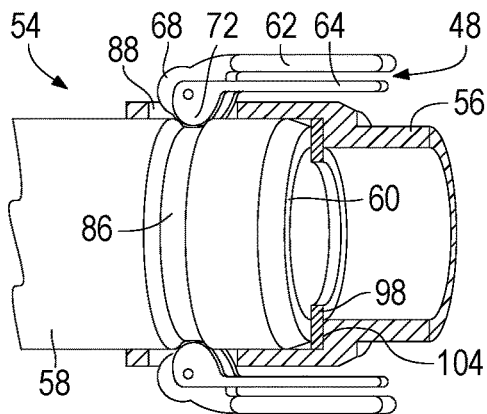
FIGS. 8-10 are sectional views of a first embodiment of the present invention with certain parts shown in perspective for ease of illustration.
Figure 11:
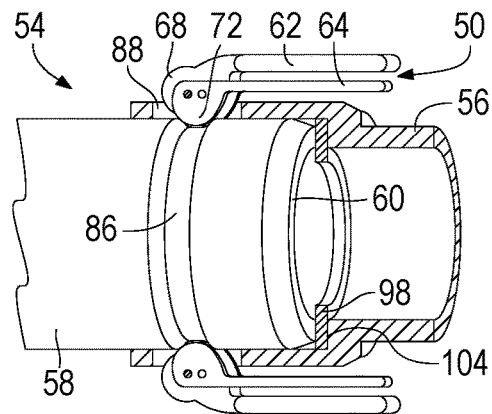
FIGS. 11-13 are sectional views of a second embodiment of the present invention with certain parts shown in perspective for ease of illustration.
Figure 9:
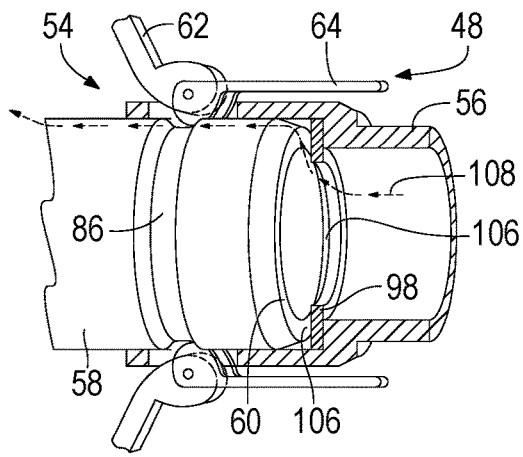
Figure 10:
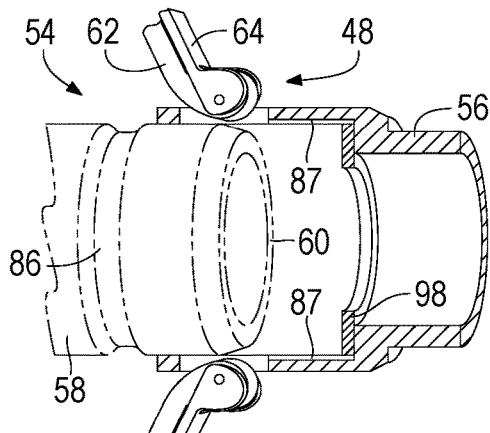
Figure 45:
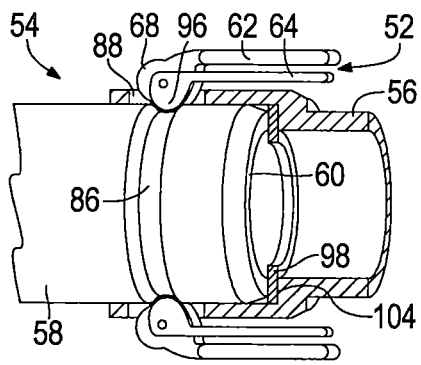
FIGS. 45-47 are sectional views of a third embodiment of the present invention with certain parts shown in perspective for ease of illustration.
Figure 46:
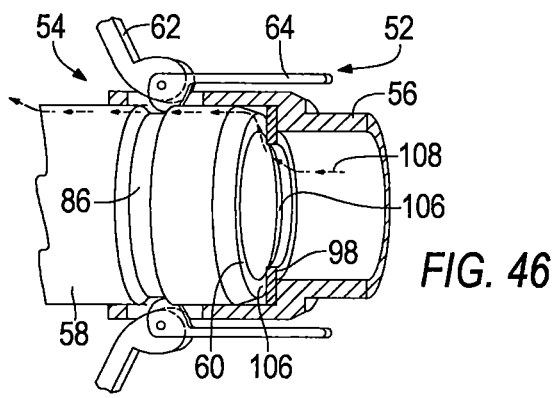
Figure 47:
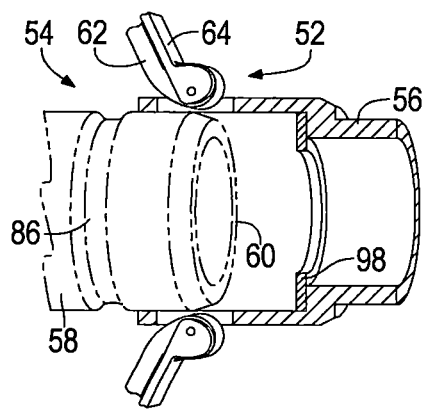

Turning to FIGS. 8-13 and FIG. 45-47, therein is shown the steps of operation of the three embodiments 48, 50, 52 of an improved cam lock fitting 54 designed according to the teachings of the present invention wherein FIGS. 8-10 shows embodiment 48, FIGS. 1-13 shows embodiment 50 and FIGS. 45-47 shows embodiment 52. For each embodiment 48, 50, 52 therein is shown the movement of the male end portion 58 relative to the female portion 56 as the cam lock fitting 54 of the present invention is being opened; the steps would be reversed for closure of the cam lock fitting. FIGS. 8, 11 and 45 show the male end portion 58 connected to and mated tightly to the female portion 56 as would be the condition when the cam lock fitting 54 is in a sealed position with double cam lever 62, 64 in a downward closed position so that the end 60 of the male end portion 58 is tightly sealingly engaged against the front side of circular gasket 98 of the female end portion 56 with the lobes 68, 72 or 96 in groove 86; also, the rear side of gasket 98 is tightly sealed against the front surface of the inner flange 104 of the female end portion 56.

Figure 12:
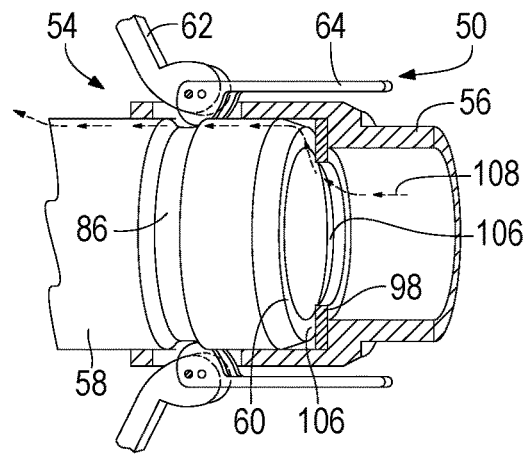
Figure 13:
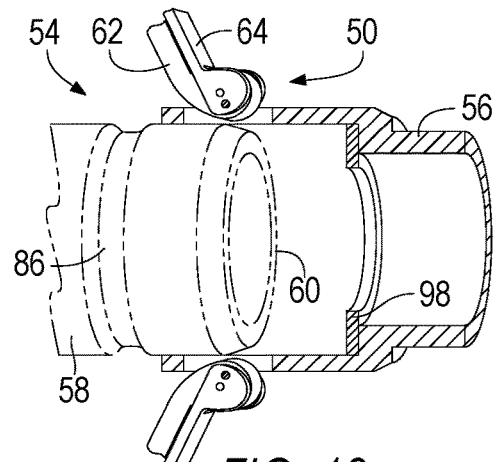

In contrast, FIGS. 9, 12 and 46 shows the larger cam lobe of outer cam lever 62 in the open position and shows the smaller cam lobe 72, 96 of inner cam lever 64 remaining in the groove 86 and also shows the male end portion 58 with a small space 106 being defined in between its end 60 and the gasket 98 which would occur when the outer cam lever 62 is in an upward open position which would cause the ends 60 of female end portion 56 and male end portion 58 to slightly separate thereby allowing the release of pressure or a small amount of material in the form of leakage or discharge as indicated by arrows 108 from the inside of the female portion 56 of the cam lock fitting 54. Arrows 108 illustrate material/fluid moving into space 106 and then out the fitting 54 by escaping between the male and female couplings 58, 56. FIGS. 10, 13 and 47 illustrate that the male end 58 can only be completely released from the female end 56 when the outer and inner cam levers 62, 64 are both moved to the open position and when this occurs, each of the lobes 68, 72, 96 become disengaged from groove 86 to allow the male 58 and female 56 end to be completely separated from each other. Previously disclosed elements may also be shown.

Figure 14:
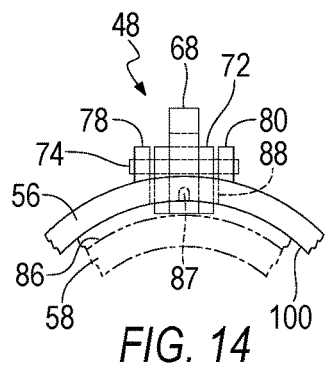
FIG. 14 is an end elevation view taken from the front of portions of a first embodiment of the present invention.
Figure 15:
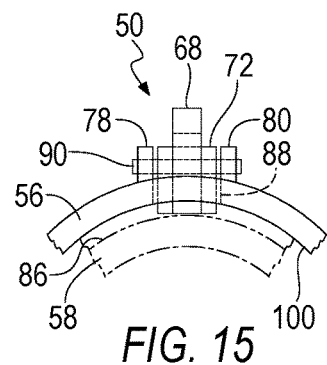
FIG. 15 is an end elevation view taken from the front of portions of a second embodiment of the present invention.
Figure 48:
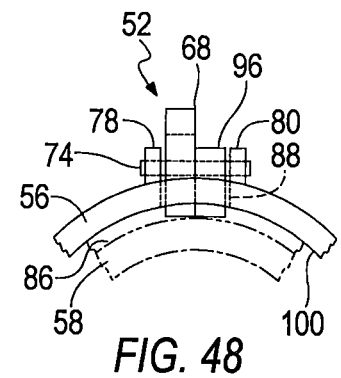
FIG. 48 is an end elevation view taken from the front of portions of a third embodiment of the present invention.

Turning to FIGS. 14-15 and 48, the three embodiments 48, 50, 52 of an improved cam lock fitting of the present invention are shown mounted on a female end portion 56 also showing portions of the male end portion 58 along with groove 86 in phantom line; wherein FIG. 14 shows embodiment 48, FIG. 15 shows embodiment 50 and FIG. 48 shows embodiment 52. Shown therein is the inside 100 of the female coupling 56 along with the alternative double cam levers 48, 50, 52 on one side only of the female end portion 56 showing the bosses 78, 80 on the female coupling 56. Note that the openings 88 are sized and shaped to accommodate movement of the cam lobes of the double levers of the present invention; also, it should be clear that the lobes and levers could have many shapes and thicknesses other than those which are illustrated so long as they are effectively sized and shaped to accomplish the teachings of the present invention all of which would be understood by one skilled in the art. The bosses 78, 80 are attached onto the outside of the female coupling 56 in the conventional manner. In FIG. 15, the axles 74, 90 lie in the same horizontal plane and therefore only the front axle 90 in aperture 92 is visible in this drawing. Previously disclosed elements may also be shown as were discussed relative to the respective embodiments 48, 50, 52 of FIGS. 2-3 and FIG. 41.

Figure 16:
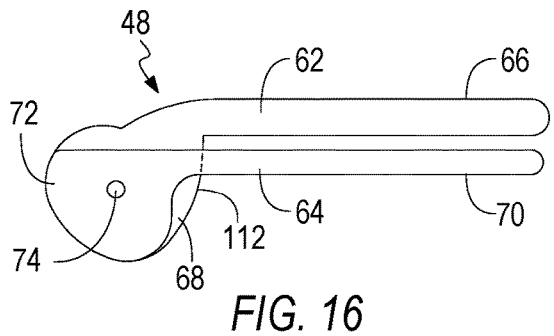
FIG. 16 is a side elevation view of the double cam lever of a first embodiment of the present invention.
Figure 17:
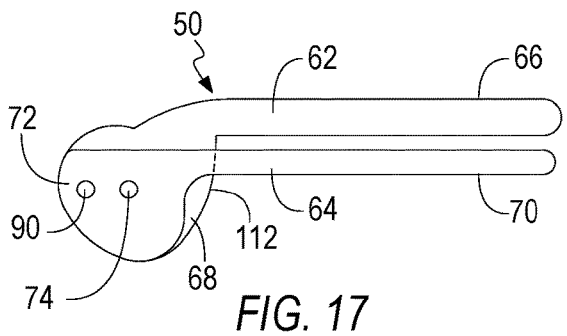
FIG. 17 is a side elevation view of the double cam lever of a second embodiment of the present invention.
Figure 49:
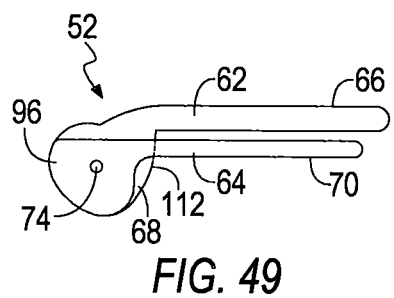
FIG. 49 is a side elevation view of the double cam lever of a third embodiment of the present invention.

Turning to FIGS. 16-17 and FIG. 49, enlarged views of the alternative double cam levers/ears of the three embodiments 48, 50, 52 are shown illustrating the features of the three embodiments as previously disclosed relative to the respective embodiments 48, 50, 52 of FIGS. 2-3 and FIG. 41. FIG. 16 shows embodiment 48, FIG. 17 shows embodiment 50 and FIG. 49 shows embodiment 52. In FIGS. 16,17, cam lobe 68 of outer cam ear 62 is larger, i.e., having a larger radius on its rear peripheral portion 112 which is visible when closed, than cam lobe 72 of inner cam ear 64 as shown at 112. In FIG. 49 cam lobe 68 of outer cam ear 62 is larger than cam lobe 96 of inner cam ear 64. Regarding FIGS. 16-17 and FIG. 49, because cam portion 68 has a larger radius or enlargement on its rear portion 112 than cam portion 72, 96 as measured at its horizontal plane through its central axle, it therefore is configured to extend further to the rear and effectively and substantially fills or engages the complimentarily sized groove 86 causing a complete seal between the gasket 98 and the male end portion 58 in the closed position as shown in FIGS. 8, 11 and 45; however, after the outer cam lever/ear 68 has been opened and when the smaller cam lobe portion 72, 96 protrudes into groove 86 it doesn't completely fill the groove so the space 106 is formed as shown in FIGS. 9, 12 and 46 between the end 60 of the male end 58 and the gasket 98 of the female end portion 56. FIGS. 10, 13 and 47 show the female 56 and male 58 ends completely separated with cam lever/ears 62, 64 in the open position. Also, FIGS. 16-17 and FIG. 49 show outer cam lever 62 overlying inner cam lever 64.

Figure 25:
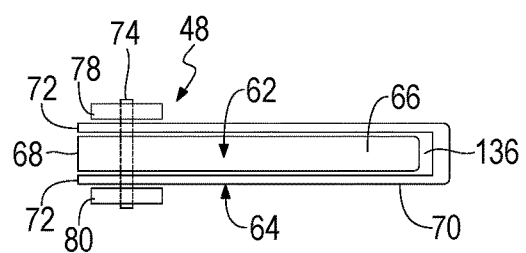
FIG. 25 is a top view of the double cam lever of an alternative embodiment of the present invention.

Turning to FIG. 18, therein is shown an alternative embodiment of the present invention showing the inner cam lever 64 being larger on its rear peripheral portion 112 than the outer cam lever 62. Previously disclosed elements are also shown. FIG. 25 shows a top view of the alternative embodiment of FIG. 18 showing the inner cam lever 64 being larger than the outer cam lever 62.

Figure 19:
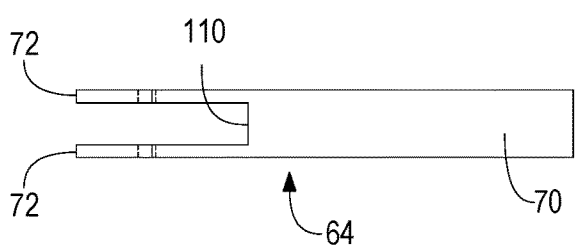
FIG. 19 is a top view on the inner cam lever of a first embodiment of the present invention.

Turning to FIG. 19, therein is shown a top view of the inner cam lever 64 of the first embodiment of the present invention showing previously disclosed elements. Space/cutout 110 between the prongs of the forked ends of the cam lobe portions 72 is also shown. It can be seen that the cam lobe portions 72 form the prongs of the forked portion.

With reference to embodiments 48, 50 and 52, the cam members 62, 64 pivot substantially in a vertical plane passing through the centerline of the cam lock fitting/coupling 54 with the axles 74, 90 being substantially perpendicular to the centerline, and, the cam members are disposed on the bosses 78, 80 so that the cam lobes 68, 72, 96 and the axles will be properly operationally aligned with the groove 86 as required by each embodiment 48, 50, 52 all of which would be understood by one skilled in the art. The axles 74, 90 may be solid or hollow pins, roll pins or the like. Cam members 62, 64 are disposed substantially 180 degrees apart on opposite sides of the female conduit 56 and therefore all mechanical forces related to associated stresses or torque resulting from operation of the cam members are evenly distributed around the cam lock fitting 54. This will prevent warping of the elements of the present invention over time.

Turning to FIGS. 20-24, therein is shown an embodiment of the present invention 10 which provides an automatic lever latching mechanism disposed on levers 62, 64, generally indicated by reference numeral 113, so that when the levers 62, 64 are moved from an open position into a closed position they become automatically latched in the closed position so that before an operator opens the levers he will have to actuate a member or pull ring member 114 or the like in order to open the first and second levers 62, 64, or as shown in FIG. 22, he would use the or pull ring 114 to open only one lever which would have the lever latching mechanism or lock assembly 113 thereon. The lock assembly 113 would be in mechanical cooperation with the cam members 62, 64 to prevent the unintentional movement thereof. In either embodiment, the operator would have to operate a lever latching mechanism 113 before he could open the levers 62, 64 thereby preventing the cam levers from being inadvertently opened. Inner lever 64 is shorter than outer lever 62 for convenience and ease of operation by the operator/user although they may be of the same length. Previously disclosed elements are also shown as were discussed relative to the respective embodiments 48, 50 of FIGS. 2-3.

Continuing with FIGS. 20-24, therein is shown the present invention 10 having a pair of double cam levers 62, 64 mounted on opposite sides of the female end portion 56 wherein each pair has an outer cam lever 62 and an inner cam lever 64. Outer cam lever 62 has a lever portion 66 and an eccentric cam lobe portion 68, and, inner cam lever 64 also has a lever portion 70 and first and second eccentric cam lobe portions 72 wherein the first and second cam lobe portions are fork shaped and spaced apart a distance thereby creating a cutout 110 or space sufficient to allow the cam lobe portion 68 to fit therein between which causes the inner and outer cam levers 62, 64 to be disposed symmetrically about the female end portion 56 which assures smooth operation throughout the life span of a cam lock fitting 54 made according to the teachings of the present invention 10. FIGS. 20, 21, 23 and 24 discloses embodiment 48 which uses a single axle 74 whereas FIG. 22 discloses embodiment 50 which uses double axles 74 and 90.

Turning to FIG. 20, therein is shown the present invention 10 exploded away from the female end portion 56 and incorporates embodiment 48. Shown therein is the inside 100 of the female coupling 56 along with the double cam levers 48 on opposite sides of the female end portion 56 showing the bosses 78, 80 on the female coupling 56. Note that the openings 88 are sized and shaped to accommodate movement of the cam lobes of the present invention. The bosses 78, 80 are attached onto the outside of the female coupling 56 in the conventional manner. Male end portion 58 is also partially shown in phantom line. Previously disclosed elements are also shown as were discussed relative to the respective embodiments 48, 50 of FIGS. 2-3.

Also shown in FIG. 20, is a pull ring member 114 attached to an end 116 of a pin 118 wherein the pull ring passes through a slot or aperture 120 on an end of the pin which pin is slidably disposed in a housing 122 attached onto a side of lever 62, 64 so that each lever 62, 64 has a housing 122 and a pin 118 (pin 118 may be referred to as an engagement member in the claims) mounted thereon. Pull ring member 114 may be a multi-turn wire ring being useful for manipulating levers 62, 64. Note that the pin or engagement member 118 is mounted inside the housing 122 so as to be slidably disposed in the housing so that the pin slides along the longitudinal axis of the levers 62, 64. The pin 118 also has a second end or tip 124 having an inclined surface 126 thereon. The pin 118 extends along and is slidable along an axis of a respective lever 62, 64 so that when the levers 62, 64 are in a closed position the tip 124 of pin 118 latches underneath the rear portion of upper and lower corresponding retaining protrusions 128, 130 disposed on a rear portion of boss 78 as best seen in FIG. 23.

Continuing with FIGS. 20-24, when the respective members or pull ring members 114 of levers 62, 64 are pulled rearwardly toward end 84 of female conduit 56 in the direction along the axis of the pin 118, the pin 118 is moved in a bore within the housing 122 against the biasing member, being spring 132, as would be understood by one skilled in the art. In operation, when the levers 62, 64 are pivoted from the open position to the locking position the inclined surface 126 of the tip of the pin 124 of each pin 118 eventually abuts against the rear upper surface of retaining protrusion 128, 130 of the respective retaining protrusions so that the tip 124 of the pin moves downwardly across the surface of the respective retaining protrusions 128, 130 due to further pivoting movement of the corresponding lever 62, 64 so that the tip 124 of pin 118 becomes eventually positioned underneath the respective retaining protrusions 128, 130 as the pin tip 124 is forced to be extended from the housing 122 due to the action of the internal spring 132 shown on each lever 62, 64 as best seen in FIG. 23. In operation, when the operator desires to disengage or to open the levers 62, 64 and move them from a closed position to an open position the pull rings 114 are pulled toward the rear to retract the respective tips 124 of pins 118 in levers 62, 64 back into the housing 122 against the biasing action of the springs 132 so that the tips of pin 124 become disengaged from underneath the rear of the respective retraining protrusions 128, 130 so that the levers 62, 64 can then be pivoted upwardly to an unlocked position so that the couplings 56, 58 of the present invention 10 can be disengaged as best seen in FIG. 24. In this manner, the male coupling 58 and female coupling 56 can become separated or disconnected, all of which would be understood by one skilled in the art.

Turning to FIG. 21, therein is shown the embodiment 48 which has been previously disclosed in relation to FIG. 5 of the present invention 10 shown in combination with the previously disclosed lever latching mechanism 113.

Turning to FIG. 22, therein is shown the embodiment 50 which has been previously disclosed in relation to FIG. 7 of the present invention 10 shown in combination with the previously disclosed lever latching mechanism 113.

Turning to FIGS. 22-24, therein are shown partially cut-away side views of the present invention 10 showing pull rings 114 disposed on respective levers 62, 64 being attached through an aperture 120 in the end of respective pins 118 also showing the housing 122 along with the biasing spring 132, or the like, wherein the tips 124 of the pin are shown along with the inclined surface 126 and respective retaining protrusions 128, 130 disposed on boss 78. FIG. 23 shows the levers 62, 64 in a closed position similar to FIG. 8, and, FIG. 24 shows the levers 62, 64 in an open position similar to FIG. 10 wherein the pull rings 114 of the levers 62, 64 have been operated and moved by a finger 134 of an operator/user so that the tips of the pin 124 are no longer captured underneath the corresponding retaining protrusions 128, 130 of the bosses 78. Inner lever 64 is shorter than outer lever 62 for convenience and ease of operation by the operator/user. Levers 62, 64 are configured so that the tip 124 of lever 64 mates with the retaining protrusion 130 and the tip 124 of lever 62 mates with retaining protrusion 128. Direction arrows are shown in certain figures to indicate movement of the elements.

Turning to FIG. 25, therein is shown a top view of the alternative embodiment showing the inner cam lever 64 being larger than the outer cam lever 62 as was previously disclosed with respect to FIG. 18. It can be seen that inner arm 64 is configured, sized and shaped so that it can be moved from the closed position to the open position without touching or interference from the outer arm 62. This is accomplished by providing a space 136 between inner arm 64 and outer arm 62 which allows inner arm 64 to substantially surround outer arm 62 so that the inner arm can be operated without moving the outer arm. It can be seen that the longitudinal central axis of the outer and inner cam levers 62, 64 are substantially co-aligned so that the axis of the outer lever is directly above the axis of the inner lever.

Figure 26:
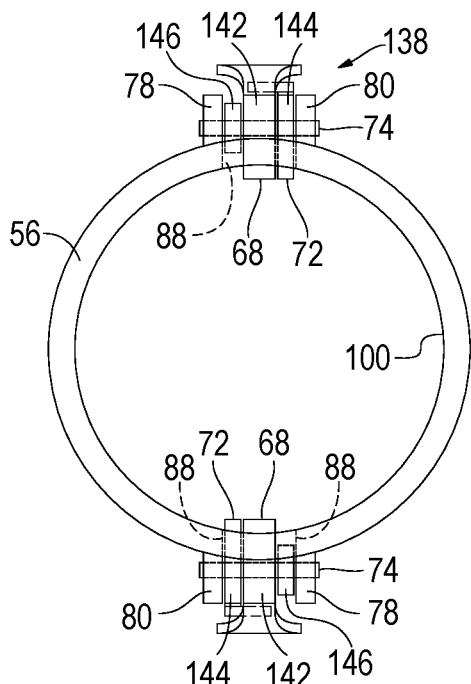
FIG. 26 is an end elevation view of the double cam levers taken from the front of portions of an alternative embodiment of the present invention.
Figure 28:
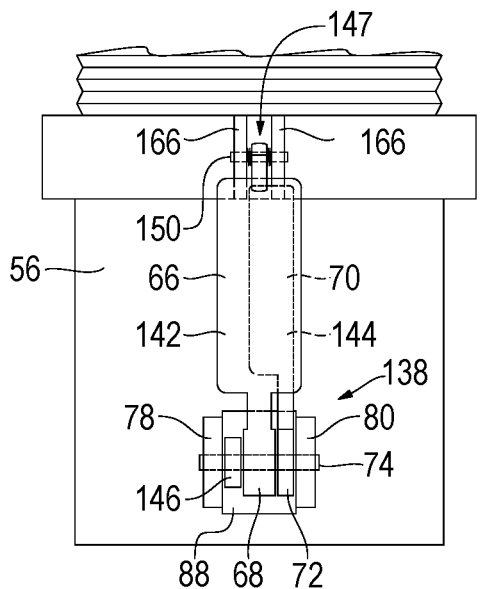
FIG. 28 is a top view of the double cam lever of an alternative embodiment of the present invention.
Figure 30:
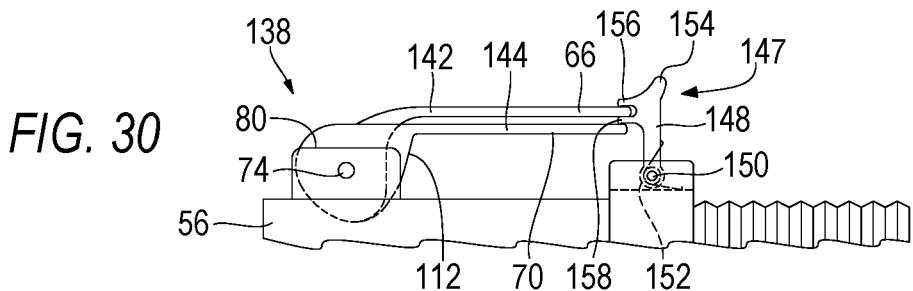
FIG. 30 is a side elevation view of the double cam lever of an alternative embodiment of the present invention.

Turning to FIGS. 26, 28 and 30, therein is shown an alternative embodiment 138 of an improved cam lock fitting of the present invention shown mounted on a female end portion 56. Shown therein is the inside 100 of the female coupling 56 along with the double cam levers 142, 144 mounted on an axle 74 in a side-by-side relationship which axle is also mounted on the bosses 78, 80 of the female coupling 56. Note that the openings 88 are sized and shaped to accommodate movement of the cam lobes 68, 72 of the double levers 142, 144 of the present invention; also, it should be clear that the lobes and levers could have many shapes and thicknesses other than those which are illustrated so long as they are effectively sized and shaped to accomplish the teachings of the present invention all of which would be understood by one skilled in the art. The bosses 78, 80 are attached onto the outside of the female coupling 56 in the conventional manner. It is expected that cam lever 142 would have the larger cam lobe 68 thereon relative to the cam lobe 72 but one skilled in the art would understand that these could be reversed. Alternative embodiment 138 shows a cam member 144 disposed adjacent a first boss 80, wherein a spacer 146 is disposed on the axle 74 adjacent the second boss 78, wherein the first cam member 142 is disposed between the other cam member 144 and the spacer 146. FIG. 28 shows the ear or arm portion 66 of lever 142 being larger and disposed over ear portion 144 so that the ear or arm portion 66 of lever 142 is outside relative to ear portion 70 of lever 144 as best shown in FIG. 30. Thus, lever 142 may be referred to as an outer lever and lever 144 as an inner lever. In order to accomplish this the neck area or portion between the cam lobe portion and the arm/lever portion of the outer lever may be shaped differently and be longer to extend further away from or be more vertically angled relative to housing 56 and some experimentation may be necessary to find the optimum shape, length or angle for the neck areas. The lever arm portion 66 of the outer cam ear 142 is larger, i.e., wider, than the lever portion 70 of the inner cam ear 144 so that it will be easier to grasp in the hands of an operator; also, the inner cam ear is not intended to be opened until after the outer cam ear is opened and having a wider outer ear helps accomplish this objective. A cylindrical spacer 146 is also shown mounted on the axle so as to cause the larger cam lever 142 to be precisely aligned with its corresponding larger cam lever 142 mounted on the opposite side of the female coupling 56 so as to balance all structural torques and forces so as to prevent warping of the housing 56 or axle 74 which may occur with conventional designs over a period of time. FIG. 30 shows an optional latch mechanism or lock assembly 147 useful for embodiment 138 including a latch arm or lever 148 which moves on a pivot 150 disposed on a pair of mounts 166 which lever is biased closed by spring 152. Also shown is thumb grip 154 to allow a user to actuate the lever 148 along with a first catch 156 for the larger ear 142 and a second catch 158 for smaller ear 144. In operation, the latch arm or lever arm 148 must be moved from the closed position to an open position before the cam levers 142, 144 can be operated. Previously disclosed elements may also be shown.

Figure 27:
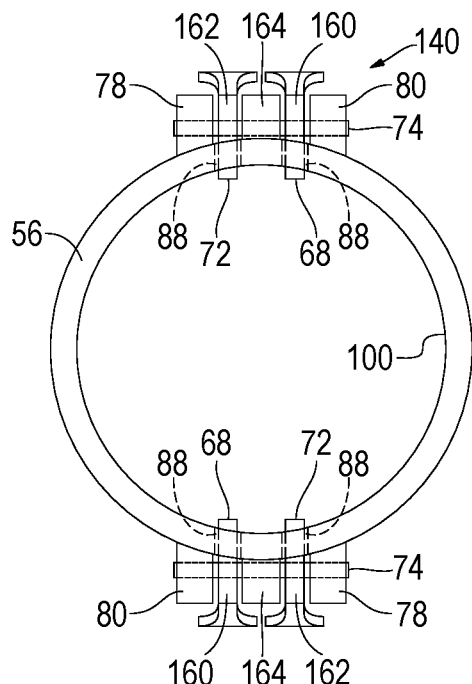
FIG. 27 is an end elevation view of the double cam levers taken from the front of portions of an alternative embodiment of the present invention.
Figure 29:
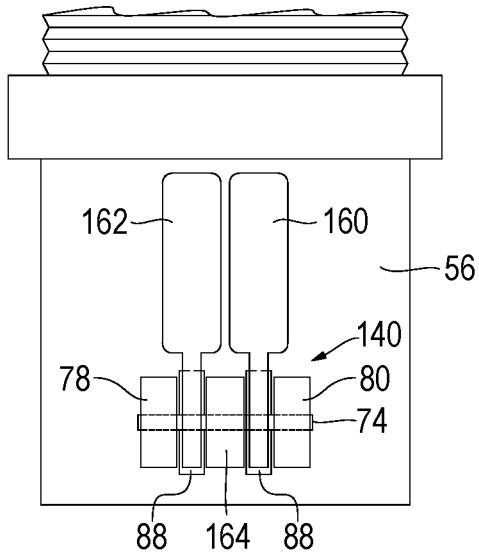
FIG. 29 is a top view of the double cam lever of an alternative embodiment of the present invention.

Turning to FIGS. 27 and 29, therein is shown an alternative embodiment 140 of an improved cam lock fitting of the present invention shown mounted on a female end portion 56. Shown therein is the inside 100 of the female coupling 56 along with the double cam levers 160, 162 mounted on an axle 74 in a side-by-side relationship which axle is also mounted on the bosses 78, 80, and 164 of the female coupling 56. Note that the openings 88 are sized and shaped to accommodate movement of the cam lobes 68, 72 of the double levers 160, 162 of the present invention; also, it should be clear that the lobes and levers could have many shapes and thicknesses other than those which are illustrated so long as they are effectively sized and shaped to accomplish the teachings of the present invention all of which would be understood by one skilled in the art. The bosses 78, 80, and 164 are attached onto the outside of the female coupling 56 in the conventional manner. It is expected that cam lever 160 would have the larger cam lobe 68 thereon relative to the cam lobe 72 but one skilled in the art would understand that these could be reversed. FIG. 29 shows the ear or arm portion 66, 70 disposed in a side-by-side relationship with cam member 160 disposed between boss 80 and boss 164 and cam member 162 disposed between boss 78 and boss 164. The cam member 160, 162 are precisely aligned with its corresponding cam member on the opposite side of the female coupling 56 so as to balance all structural torques and forces so as to prevent warping of the housing 56 or axle 74 which may occur with conventional designs over a period of time. Having the third boss 164 assures that all structural torques and forces are balanced so as to prevent warping of the housing 56 or axle 74. FIG. 30 shows an optional latch mechanism 147 useful for embodiment 140 including a latch arm or lever 148 which moves on a pivot 150 which pivot is biased closed by spring 152. Also shown is thumb grip 154 to allow a user to actuate the lever 148 along with a first catch 156 or catch 158. In operation, the latch lever arm 148 must be moved from the closed position to an open position before the cam levers 160, 162 can be operated. Alternatively, the latch mechanism 113 disclosed in FIGS. 20-24 could be easily adapted for use with cam members 160, 162. Previously disclosed elements may also be shown.

Turning to FIGS. 31-35, therein is shown an alternative embodiment of the present invention 10 which is similar in operation to the embodiment previously disclosed relative to FIGS. 20-24 except that instead of the retaining protrusions 128, 130 being disposed on a rear portion of boss 78 they are disposed on a rear portion of a separate latch plate 168 which plate is mounted beside or adjacent the boss 78 in the vertical plane so as to be disposed between the nearer cam lobe portion 72 of cam lever 64 and boss 78 and being carried on axle 74 which axle passes through aperture 170 of the plate 168. Plate 168 has an offset 172 so as to align protrusions 128, 130 with tip 124 of pin 118 so as to avoid boss 78 as best seen in FIGS. 31 and 33. Plate 168 is prevented from rotating about axle 74 in the vertical plane by having its front and rear inner surfaces 174, 176, respectively, contact the outer surface of wall 102 of female end portion/conduit 56 which wall 102 serves as a stop as best seen in FIG. 35. Plate 168 is relatively thin and could be made of many types of material so as to be strong, durable and lightweight such as aluminum, steel, stainless steel or the like. Also shown on FIG. 31 is arm 62 having a conventional round pull ring member 114 made of multistrands of wire and which is commonly used. FIG. 32 shows outer handle 62 overlying inner handle 64 and having a greater surface area. Previously disclosed elements are also shown.

Turning to FIGS. 36-40, therein is shown an alternative embodiment of the present invention 10 which is similar in operation to the embodiment previously disclosed relative to FIGS. 31-35 except that instead of the two retaining protrusions 128, 130 being disposed on a rear portion of separate latch plate 168, the plate 186 has only one retaining protrusion 130 disposed thereon. The purpose of this embodiment is to reduce the weight and costs of manufacturing the present invention 10. Furthermore, outer cam lever 62 has no housing 122 or pin 118 on its side but instead uses an optional latch mechanism or lock assembly 178 including a latch arm, clip or member 180 which member has one end which moves on a pivot 182 disposed on a rear portion of outer cam lever 62 and a second end having a spring steel portion forming a clamping portion or clamp 184 for frictionally engaging or mating with an inner surface of inner cam lever 64 so that that outer cam lever 62 is clamped/latched to inner cam lever 64 by using latch mechanism 178. Also see that housing 122 and pin 118 are shortened on inner cam lever 64. In operation, the latch member or clip 180 must be swung or moved from the closed position to an open position before the cam lever 62 can be released from cam lever 64 and thereby operated and opened as best seen in FIGS. 39-40. One skilled in the art would also understand that the latch mechanism or lock assembly 147 shown relative to FIGS. 28 and 30 could be adapted for use instead of latch mechanism or lock assembly 178 with this alternative embodiment shown relative to FIGS. 36-40 which would allow the latch mechanism 178 to be removed from these embodiments. Previously disclosed elements are also shown.

Turning to FIG. 41, therein is shown a view similar to FIG. 2 except that another embodiment 52 is shown. The female and male end portions 56, 58 are essentially the same with the main difference being that inner cam ear 64 has only a single cam lobe portion 96 that lies in a side by side relationship relative to cam lobe portion 68 of the outer cam ear 62 wherein the cam lobe portions 68, 96 are mounted on and spaced along a single, substantially centrally disposed axle 74 which axle 74 is mounted on bosses 78, 80 so that the cam lobes 68, 96 can pass through opening 88 so as to contact groove 86 on the male end portion 58. The operation of embodiment 52 is similar to embodiment 48 and the steps of operation have been previously disclosed relative to embodiment 48 of FIG. 2 in that outer lever 62 is mounted generally in overlying relation outside inner lever 64 and must be opened first before inner lever 64 is opened because inner lever 64 is mounted generally underneath so as to be in underlying relation to outer lever 62, thus, the longitudinal centerline of outer lever 62 is farther away toward the outside from the centerline 46 of female coupling 56 than the longitudinal centerline of inner lever 64. The cam lobe portions 68, 96 are mounted so that a face of one is contiguous with a face of the other.

Figure 44:
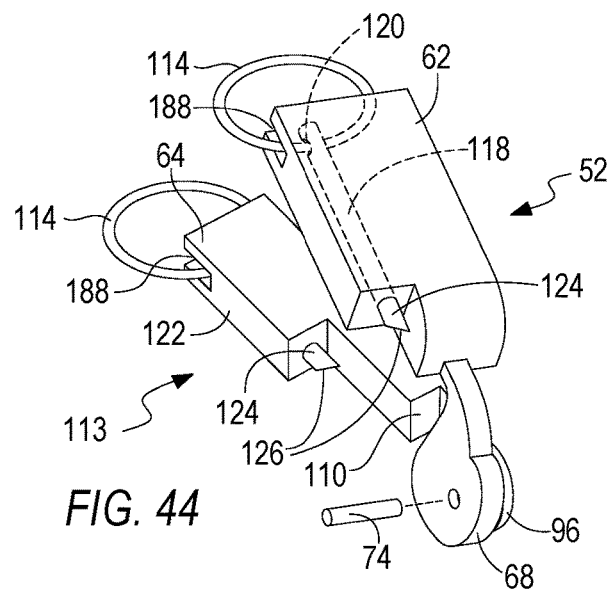
FIG. 44 is a perspective view of a lever latching embodiment of a third embodiment of the present invention.

Turning to FIG. 44, therein is shown embodiment 52 as previous discussed showing embodiment 52 having similar elements as previously discussed relative to embodiment 48 of FIG. 21. Also shown is a horizontal slot 188 provided across the entire width of the end of cam levers 62, 64 for forming a receptacle for receiving a portion of ring member 114 therein for securing the ring member to prevent it from flopping around loose and becoming possibly tangled with other equipment and also to maintain the angled surfaces 126 of pin tips 124 in a proper downward disposition so as to properly and easily contact the retaining protrusions 128, 130 (not shown, see FIGS. 23, 24). The slots 188 could be used with any of the embodiments related to the present invention including embodiments 48, 50. The lever latching mechanism or lock assembly 113 assist in preventing inner cam lever 64 from being inadvertently opened before outer cam lever 62 and to prevent cam levers 62, 64 from being inadvertently opened together.

Figure 50:
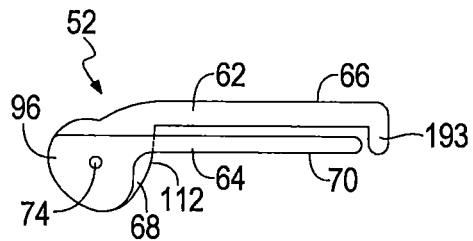
FIG. 50 is a side elevation view of the double cam lever of a third embodiment of the present invention.
Figure 61:
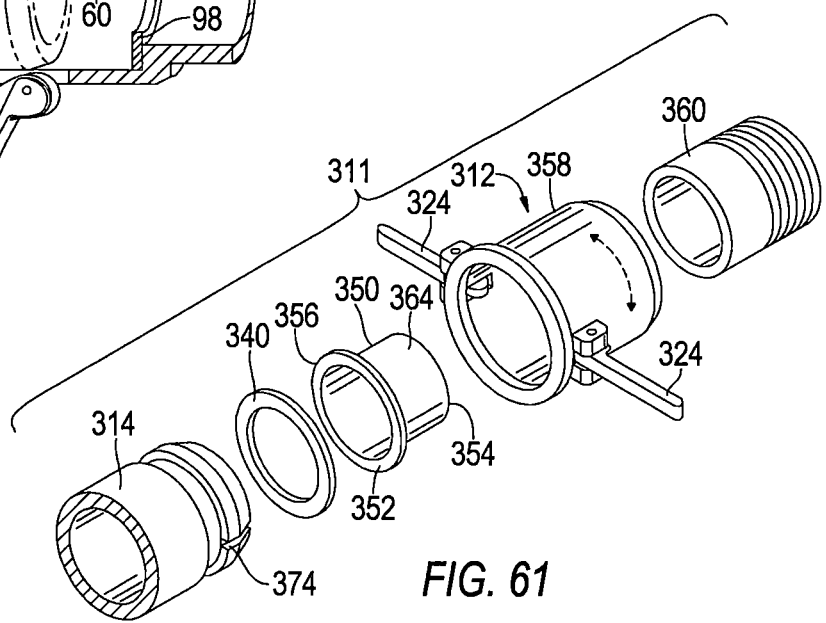
FIG. 61 is an exploded perspective view of an alternative embodiment of the present invention.

Turning to FIG. 50, therein is shown embodiment 52 as previous discussed showing embodiment 52 having similar elements as previously discussed relative to FIG. 49 and additionally having a downwardly disposed hand guard, elbow or shield 193 on the end of outer cam lever 62 to assist in preventing inner cam lever 64 from being inadvertently opened before outer cam lever 62 and to prevent cam levers 62, 64 from being inadvertently opened together. Hand guard 193 is intended to insure that the fingers or hand of a user grasp outer cam lever 62 first to be sure it is opened prior to grasping inner cam lever 64.

Turning to FIGS. 51 to 56, therein is shown a preferred alternative embodiment of the present invention 10 similar to that which was shown in FIGS. 41-50 with the main differences being that the pin housings 122 are mounted on the inner side, underside or inside of the levers 62 and 64, i.e., on the side of the levers oriented toward the housing 56 as plainly shown in FIGS. 45, 46, and, the retaining protrusion 128 is mounted on a latch body 129 as opposed to a boss 78, 80. This configuration allows the pins 118, springs 132, and pin housing 122 to be similarly sized so as to reduce costs associated with manufacturing the present invention 10. Also, no more than one cam lobe portion 68, 96 is shown on each lever 62, 64. A person skilled in the art would understand how the embodiment shown in FIGS. 51 to 56 can be used according to the teachings of the present invention 10 as has been previously taught in this specification.

Also shown in FIG. 51 is latch body/retaining member 129 mounted onto the outer surface of the female coupling 56 proximate to inner lever 64 having a retaining protrusion 128 thereon along with a notch 131 for receiving the tip 124 of pin 118 of the inner cam lever 64 when in the closed or locked position. An isolated detail view also shows an alternative design for the retaining member/latch body 129 which includes an aperture 202 for receiving the tip of pin 124 of the inner cam lever 64 when in the locked position. Previously disclosed elements are also shown. Also shown is an isolated detail view showing an alternative design for the latch body/retaining member 129, which serves the same purpose as the previously disclosed latch body/retaining members 129, including opposing sidewalls 79, 81 which are formed by a rearward extension from bosses 78, 80, respectively, for supporting a cross member 83 which extends between the rearwardly extending sidewalls 79, 81 to provide a structure for supporting an aperture 194 for receiving the tip 124 of pin 118 as previously taught and disclosed herein. Furthermore, an alternative design to the aperture 194 would be to simply put a notch similar to the notch 131 of retaining protrusion 128 so that the notch could be used in place of the aperture 194. Also note, that arm 62 has a round pull ring member 114 thereon similar to that disclosed relative to FIG. 31.

FIG. 52 shows elements similar to those previously disclosed relative to FIGS. 21, 44 and 51.

Turning to FIG. 53, therein are shown previously disclosed elements. Also disclosed are collar bushings, or bushing, 196 disposed on each end of the bore of the pin housing 122 of the levers 62, 64 which bushings carry the pin 118 to allow it to smoothly slide back and forth in the bore of each of the pin housings 122. Rear bushing 196 is press fit to the inside of the bore and the front bushing is press fit to, or made as a part of, the pin 118 and slides in the bore along with the pin 118 to assure smooth operation. Note that arm 62 of FIG. 53 has a pull ring member 114 which is made in the shape of a conventional metal spring clip hook which is commonly used on a lanyard or key chain. Note that arm 64 of FIG. 53 has a pull ring member 114 which is made in the shape of a paperclip having straight sides and rounded ends. Obviously, there are other shapes of pull ring members 114 which could be used with the present invention 10.

Turning to FIG. 54, therein is shown a assembled view of the levers 62, 64 similar to FIG. 53 illustrating that the levers 62, 64 are substantially axially aligned to prevent unintentional movement of the levers 62, 64 from the closed position to the open position as previously disclosed. Note that arm 62 of FIG. 54 has a pull ring member 114 having a diameter relatively larger than the pull ring member 114 of arm 64 disposed underneath wherein the diameter of pull ring member 114 of arm 62 is substantially wider being approximately 1.5 to 2.5 times as wide as the width of arm 64. However, the width of pull ring member 114 on arm 64 disposed underneath arm 64 has a width approximately the same as arm 64 which makes it very difficult for a user to open the inner arm 64 and outer arm 62 at the same time but instead assures that the outer arm 62 will be opened before the inner arm 64 due to the fact that when arms 62, 64 are in the closed position, the user's fingers 134 grasp the pull ring member 114 of the outer arm 62 first. After the outer arm 62 is opened, then the fingers 134 of the user can easily grasp the pull ring member 114 of the inner arm 64 to open arm 64.

It should be clear that the pull ring member 114 can be made in various shapes, including round (see FIGS. 31 and 51, arm 62, pull ring member 114), a clip (see FIG. 53, arm 62, pull ring member 114), a paperclip having straight sides and rounded ends (see FIG. 53, arm 64, pull ring member 114) and, being rounded on one end and squared on the other (see FIG. 51, arm 64, pull ring member 114). The various shapes and sizes of the pull ring member 114 provide a unique and novel ergonomic feature to the present invention which has heretofore not been used in this field of art of cam lock fittings but which provide a major advantage of the present invention over the prior art. In short, when viewed from above or from a top view, the present invention has an inner arm 64 pull ring member 114 which has a narrow profile (i.e., a smaller width or diameter) relative to the outer arm 62 pull ring member 114 which has a larger diameter pull ring member 114 thereon, so that relatively speaking the outer arm 62 has a much wider profile than the inner arm 64 to ensure that the outer arm 62 is opened before inner arm 64. From an ergonomic viewpoint, the present invention 10 accomplishes this by making it more difficult to grip the inner pull ring member 114 on inner arm 64 relative to the pull ring member 114 of outer arm 62.

Experimentation has shown that the ergonomic design of the arms 62, 64 of the present invention 10 encourages the user to consciously visually look at the fitting/arms to separate/uncouple the female end 56 of the fitting as opposed to the prior art which can simply be opened by feel without looking at the fitting, thereby leading to the user becoming careless in the operation of prior art fittings which can lead to accidents and spills. The present invention 10 thereby creates a safer working environment for the operator as opposed to the prior art.

Turning to FIG. 55, therein are shown previously disclosed elements. Also shown is the manner in which the pin 118 of outer lever 62 connects to the rear lip 200 of inner cam lever 64 when the levers 62, 64 are in the closed position. It should be clear that the inclined surface 126 of pin 118 of the outer lever 62 slides over and is secured to the bottom surface of the inner surface of the rear lip 200 of inner cam lever 64 while at the same time the tip 124 of pin 118 of the inner cam lever 64 connects to and is secured to the notch 131 in the latch body 129 by passing over the retaining protrusion 128 so as to securely lock levers 62, 64 to the female conduit 56. The pins 118 of the inner and outer levers 62, 64 are each shown in locking position. The rings 114 of the levers 62, 64 are prevented from rotating so as to disorient the inclined surfaces of pins 118 relative to protrusion 128 by being placed in close proximity to the underside of the levers 62, 64. Also shown is an optional protrusion or spacer 198 placed underneath the inner lever 64 which may be used to space the inner lever 64 apart from the outer surface of the female conduit 56.

Turning to FIG. 56, therein are shown previously disclosed elements while also showing how a finger of a user 134 or a thumb and index finger can be used to grasp the pull ring member 114 and pull it to the rear so as to open the levers 62, 64 and to move them from the closed (locked) position as shown in FIG. 45 to the open (unlocked) position as shown in FIG. 46. It would also be understood by one skilled in the art, that the pull ring 114 of the inner lever 64 cannot be grasped by a finger 134 and opened, prior to the pull ring 114 of the outer lever 62 being grasped to thereby first open the outer lever 62 because the pull ring 114 of the inner lever 64 is underneath the outer lever 62 and cannot be easily grasped. This is so because the centerlines, or longitudinal axes, of the levers 62, 64 are positioned so as to be over/under each other or inside/outside each other and may be spoken of as being in aligned relation. Also illustrated in FIGS. 55-56 is an enlargement on the rear portion of cam lobe 68 as previously disclosed.

Turning to FIGS. 57-60, therein is shown an alternative embodiment 211 of an improved cam lock fitting according to the present invention. The embodiment 211 disclosed is similar to a conventional prior art cam lock fitting 10 as shown in FIG. 1 and to the double lever versions shown in FIGS. 41-46 and 51-56; however, the embodiment 211 allows portions of the fitting to be rotated by including a connecting collar 250 having a front end 252 and a rear end 254 with an outer annular peripheral flange 256 thereon which collar or circular sleeve is complimentarily sized and shaped for insertion into the inside of the female portion 212. Also shown is the female end portion 212 being of a two-piece design having a first front section 258 and a second tail section 260. FIGS. 58-60 illustrate the steps of assembling and operating the present invention showing how the connecting collar 250 can be inserted into the inside of the first section 258 of the female portion 212 and inside of the second, tail section 260 of the female portion wherein the first flange 256 contacts an internally extending flange 262 on the rear of the female coupling so as to be held firmly within the female coupling with the exterior surface 264 of the connecting collar 250 contacting the interior surface 266 of the front end 268 of the tail section 260 of the female coupling 212 wherein it is expected that the rear end of the connecting collar 250 will be press fit at 272 to the tail section 260 of the female coupling end 212. The gasket or seal 240 is inside the female coupling 212 so as to be in contact with the flange 256 on the connecting collar 250 as shown in FIG. 59 so that when the male portion 214 is inserted into the female end portion 212, the front 216 of the male portion contacts the seal 240 so as to make a seal between the male end portion 214 and the female coupling 212 as shown in FIG. 60 when the ears 224 are closed. The rear end 270 of tail section 260 is shown with a barbed end in FIG. 58, male pipe threads in FIG. 59, and female pipe threads in FIG. 60. The front section 258 is free to rotate about the connecting collar 250 while the tail section 260 is fixedly joined to the connecting collar as previously described and a sealing connection (See FIG. 60) is made between the end 216 of the male end portion 214 and the sealing gasket 240 and flange 256 of the connecting collar 250 as best shown in FIG. 60. The press fit portion 272 between connecting collar 250 and tail section 260 is shown on FIGS. 59 and 60. Also shown are groove 230, opening 232 and lever portion 226 of arm 224.

Experimentation with the present invention 10 has shown that under certain conditions, for example, high-pressure situations, discharges 108 (See FIG. 9) from the female coupling 56 are smaller than would be preferred. To ensure that discharges 108 are sufficiently large when the outer levers 62 are opened under all pressure situations and with all types of gaskets, an air vent or breather in the form of either holes 85 or slots 87 may be provided on the present invention 10 contiguous to the seat of the gasket 240 as shown in FIGS. 51 and 58-60 at 85, and in FIGS. 10 and 14 at 87. The purpose of the air vent in the form of either holes 85 or slots 87 is to provide a path for air at ambient atmospheric pressure between the seat for the gasket 240 and the outside of the female coupling 56. FIGS. 51 and 58-60 at 85 show the air vent being in the form of a throughhole disposed in the wall 102 (See FIG. 51) of the female coupling 56 wherein the vent holes 85 are expected to be about ⅛ inch in diameter and positioned so that they are within about 0.010-0.020 inch of the rear wall of the seat of the gasket 240.

FIGS. 10 and 14 at 87 show the air vent being in the form of a longitudinal slit or slot 87 placed in the wall 102 of the female coupling 56 wherein the slot is about 1/16 inch in width and about ⅛ inch in depth and extending from near the rear wall of the seat of the gasket 240 to the opening 88 (See FIG. 2). The rear end of slot 87 should be positioned so that it is within about 0.010-0.020 inch of the rear wall of the seat of the gasket 240.

It is expected that some experimentation may be necessary to determine which design, i.e., holes 85 versus slots 87, functions best for the particular application in which the present intention invention 10 is being used, depending on the size, type and placement of the female coupling and considering the type of gasket material being used, for example, depending on whether the gasket material is soft and flexible, or harder and less flexible. Neither the holes 85 or slots 87 interfere with the ability of the male 58 and female 56 conduits to seal when they are connected to each other.

By way of additional summary and with reference to FIGS. 1-60, the present invention may be described as a cam lock fitting 54, a) having a male conduit 58 having an end 60 thereon and an external peripheral groove 86 adjacent the end, b) having a female conduit 56 for receiving the male conduit and having a pair of opposed side openings 88 opposite the external peripheral groove, c) sealing at 98 between the end of the male conduit and the female conduit, d) having a first and second pair of cam members, each pair having first (outer) 62 and second (inner) 64 cam members so that there are a total of four cam members, a pair, i.e., two, of the cam members being pivotally disposed on opposite sides of the female conduit, each cam member having a lever portion 66, 70, which includes what may be referred to in the claims as a lever arm for actuation thereof by an operator which identifies a part of the lever portion 66, 70 that an operator would actually grasp with a hand or finger, lying adjacent the female conduit and a cam portion 68, 72 with a larger or more effectively sized or shaped cam portion on the first (outer) cam member 62, wherein the cam portions pass through the side openings and engage the external peripheral groove when the lever portion lies adjacent the female conduit in a first, closed position (see FIGS. 8 and 11), each lever portion being outwardly moveable away from the female conduit to a second, open position to disengage the cam portions from the external peripheral groove (see FIGS. 10 and 13), e) the male and female conduits being connected thereby preventing leakage thereinbetween when each of the lever portions are in the first position (see FIGS. 8 and 11); and, f) the male and female conduits being slightly separated, i.e., are loose fit, thereby allowing leakage thereinbetween when the lever portions of the first cam members are in the second position and the lever portions of the second cam members are in the first position (see FIGS. 9 and 12), wherein if leakage is observed by an operator the lever portions of the first cam members are moved back to the first position to permit the male and female conduits to be reconnected.

Further, wherein the cam portions of the second cam members may be forked (see FIG. 19), the forks having a space 110 thereinbetween, wherein the cam portions of the first cam members are pivotally disposed in a respective space wherein the first and second cam members pivot on a first axle 74, or, wherein the first cam members pivot on a first axle 74 and the second cam members pivot on a second axle 90. In an alternative embodiment, the inner cam lever 64 is larger than the outer cam lever 62. In alternative embodiment 52, the cam lobes 68, 96 are disposed in a side-by-side relation (see FIG. 48) while other elements remain generally the same. Also having a latching mechanism or lock assembly 113 having retaining protrusions 128, 130 mounted adjacent each of the side openings and a pin housing 122 attached to each lever portion of each cam member, a spring 132 loaded pin or engagement member 118 within each pin housing which urges a distal end 124 of the pin into engagement or mechanical cooperation with one of the retaining protrusions to prevent each of the lever portions from being unintentionally moved from the closed position to the open position, and a pull member or member usable by an operator 114, or the like, in mechanical cooperation with or attached to a proximal end 116 of the pins to allow an operator to withdraw the pin from engagement or mechanical cooperation with a retaining protrusion allowing each lever portion to be moved from the closed position to the open position.

Alternative embodiment 138 shows a cam member 144 disposed adjacent a first boss 80, wherein a spacer 146 is disposed on the axle 74 adjacent the second boss 78, wherein the first cam member 142 is disposed between the other cam member 144 and the spacer 146. Alternative embodiment 140 shows the first cam member 160 disposed between the first 80 and second boss 154, wherein the second cam member 162 is disposed between said second 154 and third boss 78. A latch mechanism or lock assembly 147 could be used with embodiment 138 or 140. Additional alternative embodiments are shown in FIGS. 31-35 wherein plate 168 is used for latching outer cam lever 62 and inner cam lever 64 to female end portion 56 and in FIGS. 36-40 wherein plate 186 replaces plate 168 and latch mechanism or lock assembly 178 is used to latch outer arm 62 to inner arm 64. An additional alternative embodiment is shown in FIGS. 51-56 where therein is shown a preferred alternative embodiment of the present invention 10 similar to that which was shown in FIGS. 41-50 with the main differences being that the pin housings 122 are mounted on the inner side, underside or inside of the levers 62 and 64, i.e., on the side of the levers oriented toward the housing 56 as plainly shown in FIGS. 55, 56, and, the retaining protrusion 128 is mounted on a latch body 129 as opposed to a boss 78, 80. Lever 62 of FIG. 54 has a pull ring member 114 having a diameter relatively larger than the pull ring member 114 of arm 64 disposed underneath wherein the diameter of pull ring member 114 of lever 62 is substantially wider making it more difficult to grip the inner pull ring member 114 on inner arm 64 relative to the pull ring member 114 of outer arm 62. Additionally, embodiment 211 discloses a rotatable cam lock fitting. Also, an air vent 85 or 87 disposed on the female conduit 56 is disclosed.

Turning to FIGS. 61-66, therein is shown an alternative embodiment of the present invention wherein a safety lock feature is included as part of the present invention 311. This embodiment includes all the features of the present invention 211 as previously disclosed in FIGS. 57-60; however, it also includes features of a conventional safety lock mechanism created by placing opposing notches 374 in the end of the male portion 314 of the cam lock fitting which operate in conjunction with a cam lever 324 having a cam portion 328 having specially designed cam lobes that are sized and shaped so that the cam lobes can pass through the notches 374 on the male portion so that the male 314 and female 312 ends can be separated. In order to align the cam lobes 328 with the notches 374, the front section 358 of the female end portion 312 must be rotated about the connecting collar 350. The cam lobe 328 comprises two portions as best shown in FIG. 65, a first larger lobe portion 327 and a second smaller lobe portion 329 expected to have a central angle offset from each other about seventy-five (75) to one hundred-forty (140) degrees as measured relative to its axle 336. When the cam lever 324 is opened the first portion to release from groove 330 is the larger portion 327 which slightly loosens the male end 314 to allow a slight space to form between the end 316 of the male portion 314 and the female end portion 312; however, the smaller lobe 329 remains in the groove 330 of the male end so that the male end can only be completely released when the female end 312 is rotated about its centerline 346 so that the smaller lobe 329 is aligned with the notch 374; when this occurs, the smaller lobe 329 can be passed through the notch 374 to allow the male 314 and female 312 ends to be completely separation from each other.

Turning more specifically to FIGS. 62-64, therein is shown the movement of the male end portion 314 relative to the female portion 312 along with rotation of the female portion 312 as the cam lock fitting 311 is being opened; the steps would be reversed for closure of the cam lock fitting. FIG. 62 shown the male end portion 314 mated tightly to the female portion 312 as would be the condition when the cam lock fitting 311 is in a sealed position with lever 326 in a downward closed position so that the end 316 of the male end portion 314 is tightly sealed against the front side of gasket 340 of the female end portion 312 with the larger lobe 327 in groove 330; also, the rear side of gasket 340 is tightly sealed against the front surface of the connecting collar 350. In contrast, FIG. 63 shows the smaller lobe 329 remaining in the groove 330 and shows the male end portion 314 with a small space 376 being defined in between its end 316 and the gasket 340 which would occur when the cam lever 326 is in an upward open position which would cause the ends 316 of the female end portion 312 and male end portion 314 to slightly separate thereby allowing the release of pressure or a small amount of material as indicated by arrows 378 from the inside of the female portion 312 of the cam lock fitting 311. Arrows 378 illustrate material/fluid moving into space 376 and then out the fitting 311 by escaping between the male and female couplings 314, 312. Smaller cam lobe 329 remains disposed in groove 330 in both FIGS. 62 and 63 because the female end portion has not yet been rotated about connecting collar 350 to align smaller cam lobe 329 with notch 374. In contract, FIG. 64 illustrates that the male end 314 can only be completely released when the female end 312 is rotated so that the smaller lobe 329 is aligned with the notch 374; when this occurs, the smaller lobe 329 can be passed through the notch 374 to allow the male 314 and female 312 ends to be completely separated from each other. Previously disclosed elements may also be shown.

Turning more specifically to FIGS. 65 and 66, an enlarged view of the cam portions 328 are shown illustrating that the larger portion 327 is wider than the smaller portion 329 and has a larger radius so that when the larger portion 327 protrudes into groove 330 it substantially fills the complimentarily sized groove causing a complete seal between the gasket 340 and the male end portion 314 as shown in FIG. 62; however, when the smaller portion 329 protrudes into groove 330 it doesn't completely fill the groove so the space 376 is formed as shown in FIG. 63 between the end 316 of the male end 314 and the gasket 3243240 and the female end portion 312. Also note that the smaller cam lobe portion 329, being narrower than notch 374 and the larger lobe 327, is sized to pass through notch 374; however, a larger cam lobe portion 327 being wider cannot pass through notch 374 because it is wider than the notch. FIG. 66 shows the end of a male end portion 314 and the notches 374 oppositely disposed in the end of the male end portion.

An additional feature of the alternative embodiment shown in FIGS. 61-66 is air vent hole 380 which is similar to the air vent hole 85 described with respect to FIGS. 51, and 58-60. The purpose of the air vent hole 380 in the form of either holes or slots is to provide a path for air at ambient atmospheric pressure between the seat for the gasket 340 and the outside of the female coupling.

Furthermore, the alternative embodiment of the present invention shown in FIGS. 61-66 could be manufactured without the rotation capability provided by the connecting collar 350 so that the female fitting 312 would not be rotatable. In this configuration, the female fitting 312 could still be used with the male fitting 314 but it would not have rotation capability and would be similar to the female fitting 12 shown in FIG. 1 (it would include cam lever 324), however, the air vent 380 could still be used to allow larger discharges illustrated by arrows 378. It is believed that one skilled in the art would understand these teachings.

Turning to FIGS. 67-69, therein is shown an alternative embodiment of the present invention 10 wherein each outer/inner cam lever 62, 64, respectively, is restrained against unintended opening or rotation by a pivoting locking member generally designated by reference numeral 382. Pivoting locking member 382 is pivotally mounted onto axle or pin 384 disposed in a corresponding hole on the cam levers 62, 64 so that the pivoting locking member 382 can be easily pivoted in the vertical plane relative to the cam arms 62, 64. Each of the outer and inner arms 62, 64 has a pivoting locking member 382 mounted on its underside in a protective housing 390.

In order to open the outer cam arm 62, the rear end 386 of the corresponding pivoting locking member 382 is moved laterally away from the body of the female end portion/conduit 56 by lifting on its corresponding pull ring 114 and pulling the ring in a direction laterally away from or substantially perpendicular to a centerline 46 of the body of the female coupling 56 so that as the rear end 386 is moved away from the body 56 of the female coupling, and in a counterclockwise direction relative to axle 384, the protruding male tip on the front end 388 of the pivoting locking member 382 of the outer cam arm 62 is rotated away from underneath the rear lip 200 of the inner cam arm 64 so that the outer cam arm 62 can be rotated from a closed position parallel to the female body 56 to an open position away from the female body 56. When the front tip 388 of the pivoting locking member 382 of the outer arm 62 is disposed underneath the rear lip 200 of the inner handle 64, the outer cam arms 62 cannot be moved from the closed position to the open position away from the female coupling 56 because front end 388 is disposed underneath axle 384 so that pivoting locking member 382 cannot be rotated until rear end 386 is lifted.

In order to open the inner cam arm 64, the rear end 386 of the corresponding pivoting locking member 382 is moved away from the body of the female cam member 56 by lifting on its pull ring 114 and pulling the ring in a direction laterally away from or substantially perpendicular to a centerline 46 of the body of the female coupling 56 so that as the rear end 386 is moved away from the body of the female coupling 56, and in a counterclockwise direction relative to axle 384, the protruding male tip of the front end 388 of the pivoting locking member 382 of the inner lever 64 is moved away from the retaining member 129 (such as hole 194 as shown in FIG. 51) so that the inner cam arm 64 can be rotated from a closed position parallel to the female body 56 to an open position away from the female body. When the front tip 388 of the pivoting locking member 382 of the inner arm 64 is coupled to the retaining member 129, the inner cam arms 64 cannot be moved from the closed position to the open position away from the female coupling 56 because front end 388 is disposed underneath axle 384 so that pivoting locking member 382 cannot be rotated until rear end 386 is lifted.

A biasing member 392, such as a coil spring as shown in FIGS. 67, 68, may be utilized so as to maintain each pivoting locking member 382 in a locking position relative to the retaining member 129 so as to maintain the cam levers 62, 64 in a locked configuration when the cam levers 62, 64 are in the closed position and parallel to the female coupling 56. The biasing member 392 as shown in FIG. 67, 68 has one end mounted onto a protrusion 394 on an upper surface of each pivoting locking member 382 intermediate opposing ends 386, 388 and the opposite end of the biasing member 392 makes direct physical contact with an inner surface of the upper surface of the cam levers 62, 64 so as to maintain the pivoting locking members 382 in a locking orientation by biasing rear end 386 toward a clockwise direction relative to axle 384. Therefore, the cam levers 62, 64 cannot be rotated to the open position unless the bias of the spring 392 is overcome by pulling on the corresponding pull rings 114 disposed on a rear end of the pivoting locking member 382. A user can pull on the pull ring 114 in a direction laterally away from the centerline of the female coupling 56 so as to open the cam levers 62, 64 and move the cam levers from a closed position parallel to the female coupling into an open position away from the female coupling, however, neither inner lever 64 or outer lever 62 can be opened by pulling on the corresponding pull ring 114 in a direction merely parallel to the centerline 46 of the female conduit 56.

Note that the front tip 388 of the pivoting locking member 382 mounted on the outer lever 62 engages the underside of a lip 200 on the rear end of the inner lever 64 so that the outer lever 62 is connected to the inner lever as shown in FIG. 67 when the outer lever 62 is in the closed position. However, the front tip 388 of the pivoting locking member 382 of the inner lever 64 contacts a structure disposed on the female coupling 56 such as retaining member 129 when the inner arm 64 is in the closed position. In order to open the outer lever 62, a user 134 must first pull on the ring 114 located on the outer lever 62 until the outer lever is moved to the open position and then the user 134 can pull on the second pull ring 114 on the inner lever 64 in order to move the inner lever 64 from a closed position to an open position. Thus, a user is prevented from opening the inner lever 64 until after the outer lever 62 is first moved from the closed position to the open position and then the inner lever 64 can be move from the closed position to the open position. Front tip 388 of the pivoting locking member 382 of outer lever 62 is disposed in a close blocking proximity to the rear end 386 of the pivoting locking member 382 of the inner lever 64 to prevent the inner lever 64 from being opened until after the outer handle 62 is first opened. Furthermore, neither inner lever 64 or outer lever 62 can be opened by pulling on the corresponding pull ring 114 in a direction merely parallel to the centerline 46 of the female conduit 56. Also, vent 85 (see, e.g., FIG. 51) may also be used with this alternative embodiment.

Turning to FIG. 69, therein is shown the underside of an exemplary cam lever, which could be either lever 62, 64, along with the pivoting locking member 382 disposed in housing 390 which housing is formed by two opposed flange-like members which extend downwardly from the outer edges of the lever 62, 64 which together provide protection from dirt, debris, or physical damage to the pivoting/rotating member 382 and biasing member 392.

A summary of the alternative embodiment disclosed in FIGS. 67-69 follows and includes a cam lock fitting 54 having male 58 and a female conduit 56 adapted for being connected to each other, the male conduit having an end 60 thereon and an external peripheral groove 86 adjacent the end 60, the female conduit having an end thereon and an internal seal 98 disposed therein adjacent the end, wherein the end of the male conduit contacts the seal of the female conduit thereby preventing leakage when the male and female conduits are connected to each other; providing a first and a second pair of cam members, each pair having first and second cam members, disposing a pair of the cam members 62, 64 on opposite sides of the female conduit, each cam member having a lever portion 66, 70 and a cam portion 68, 72, wherein each cam portion is adapted to pivot through an opening 88 in a wall of the female conduit and into the external peripheral groove so as to removably join the male conduit to the female conduit, wherein each cam member has a closed position (see FIG. 8) when the male and female conduits are connected to each other and an open position (see FIG. 10) when the male and female conduits are disconnected from each other; wherein each second cam member has an inner lever portion 64 and each first cam member has an outer lever portion 62; disposing a pivoting locking member 382 on each cam member, wherein each pivoting locking member is pivotally mounted on an axle 384 on each cam member, wherein each pivoting locking member pivots in a vertical plane, wherein each pivoting locking member is configured to engage a structure on the female conduit to prevent unintentional movement of each the cam member from the closed position to the open position; disposing a biasing member 392 on each pivoting locking member, extending the biasing member between the pivoting locking member and each cam member for biasing the pivoting locking member toward the clockwise direction about the axle of each pivoting locking member; and wherein when each cam member is in the closed position, the inner lever portion is configured to mechanically cooperate with a structure 129 on the female conduit and the outer lever portion is configured to mechanically cooperate with the inner lever portion 200 to prevent unintentional movement of each cam member from the closed position to the open position. Furthermore, including wherein when each cam member is in the closed position, a front end 388 of the pivoting locking member of the inner lever portion is configured to mechanically cooperate with the structure on the female conduit and a front end 388 of the pivoting locking member of the outer lever portion is configured to mechanically cooperate with a lip 200 on a rear end of the inner lever portion to prevent unintentional movement of each cam member from the closed position to the open position. Also, further comprising the step of providing a pull ring 114 actuatable by an operator 134 and mechanically cooperating with the pivoting locking member to allow an operator to move the pivoting locking member for moving the cam members from the closed position to the open position, wherein when the operator moves the pull ring in a counterclockwise direction the rear end 386 of the pivoting locking member is moved in a counterclockwise direction to move the cam members from the closed position to the open position, and further comprising the step of providing a housing 390 disposed on each lever portion of the cam members so that there are four housings, wherein a single pivoting locking member is disposed inside a single housing. Also, including wherein each housing comprises opposed flange-like members extending downwardly from the outer edges of the cam members for protecting each pivoting locking member wherein the cam portions of the second cam members are forked (see FIG. 19), the forks having a space 110 thereinbetween, wherein the cam portions of the first cam members are pivotally disposed in a respective space, wherein a single cam portion is disposed on the first and second cam member, the single cam portion of the first and second cam members being disposed in side-by-side relation (see FIG. 48) so that a face of the single cam portion of the first cam member is contiguous with a face of the single cam portion of the second cam member, wherein at least a portion of the female conduit is rotatable about a centerline 46 thereof and further comprising the step of providing an air vent 85 disposed in the wall of the female conduit.

We claim:
1. A cam lock fitting, comprising:
a) a male and a female conduit, said male and female conduits adapted for being connected to each other, said male conduit having an end thereon and an external peripheral groove adjacent said end, said female conduit having an end thereon and an internal seal disposed therein adjacent said end, wherein said end of said male conduit contacts said seal of said female conduit thereby preventing leakage when said male and female conduits are connected to each other;
b) a first and a second pair of cam members, each pair having first and second cam members, a pair of said cam members being pivotally disposed on opposite sides of said female conduit, each said cam member having a lever portion and a cam portion, wherein each said cam portion is adapted to pivot through an opening in a wall of said female conduit and into said external peripheral groove so as to removably join said male conduit to said female conduit, wherein each said cam member has a closed position when said male and female conduits are connected to each other and an open position when said male and female conduits are disconnected from each other;
c) each said second cam member having an inner lever portion and each said first cam member having an outer lever portion;
d) a pivoting locking member disposed on each said cam member, wherein each said pivoting locking member is pivotally mounted on an axle on each said cam member, wherein each said pivoting locking member pivots in a vertical plane, wherein each said pivoting locking member is configured to engage a structure on said female conduit to prevent unintentional movement of each said cam member from said closed position to said open position, each said pivoting locking member comprising a front tip in engagement with said struc- ture on said female conduit, a rear end, a protrusion for supporting one end of a biasing member, and a portion to accommodate said axle for said pivoting locking member to pivot about;

e) each said biasing member extending between each said pivoting locking member and each said cam member for biasing said pivoting locking member toward a clockwise direction about said axle of each said pivoting locking member;

f) a pull ring member attached directly to each said pivoting locking member through an opening in said rear end thereof for pulling and causing pivoting of said pivoting locking member and said front tip to disengage from said structure; and g) wherein when each said cam member is in said closed position, said inner lever portion is configured to mechanically cooperate with said structure on said female conduit and said outer lever portion is configured to mechanically cooperate with said inner lever portion to prevent unintentional movement of each said cam member from said closed position to said open position.

2. The cam lock fitting of claim 1, wherein when each said cam member is in said closed position, said front tip of said pivoting locking member of said inner lever portion is in engagement with the structure on said female conduit and said front tip of said pivoting locking member of said outer lever portion is configured to mechanically cooperate with a lip on a rear and of said inner lever portion to prevent unintentional movement of each said cam member from said closed position to said open position.

3. The cam lock fitting of claim 1, further comprising each said pull ring actuatable by an operator and mechanically cooperating with each said pivoting locking member to allow the operator to move said pivoting locking member for moving said cam members from said closed position to said open position.

4. The cam lock fitting of claim 3, wherein when said operator moves each said pull ring in a counterclockwise direction the rear end of said pivoting locking member is moved in a counterclockwise direction to move said cam members from said closed position to said open position.

5. The cam lock fitting of claim 1, further comprising a housing disposed on each said lever portion of said cam members so that there are four housings, wherein a single said pivoting locking member is disposed inside a single housing.

6. The cam lock fitting of claim 5, wherein each said housing comprises spaced members extending downwardly from outer edges of said cam members for protecting each said pivoting locking member.

7. The cam lock fitting of claim 1, wherein said cam portions of said second cam members are forked, said forks having a space thereinbetween, wherein said cam portions of said first cam members are pivotally disposed in a respective said space.

8. The cam lock fitting of claim 1, wherein a single said cam portion is disposed on said first and second cam member, said single said cam portion of said first and second cam members being disposed in side-by-side relation so that a face of said single said cam portion of said first cam member is contiguous with a face of said single said cam portion of said second cam member.

9. The cam lock fitting of claim 1, wherein at least a portion of said female conduit is rotatable about a centerline thereof.

10. The cam lock fitting of claim 1, further comprising an air vent disposed in said wall of said female conduit.

11. A method for assembling a cam lock fitting, comprising the steps of:

a) providing a male and a female conduit adapted for being connected to each other, the male conduit having an end thereon and an external peripheral groove adjacent the end, the female conduit having an end thereon and an internal seal disposed therein adjacent the end, wherein the end of the male conduit contacts the seal of the female conduit thereby preventing leakage when the male and female conduits are connected to each other;

b) providing a first and a second pair of cam members, each pair having first and second cam members, disposing a pair of the cam members on opposite sides of the female conduit, each cam member having a lever portion and a cam portion, wherein each cam portion is adapted to pivot through an opening in a wall of the female conduit and into the external peripheral groove so as to removably join the male conduit to the female conduit, wherein each cam member has a closed position when the male and female conduits are connected to each other and an open position when the male and female conduits are disconnected from each other;

c) wherein each second cam member has an inner lever portion and each first cam member has an outer lever portion;

d) disposing a pivoting locking member on each cam member, wherein each pivoting locking member is pivotally mounted on an axle on each cam member, wherein each pivoting locking member pivots in a vertical plane, wherein each pivoting locking member is configured to engage a structure on the female conduit to prevent unintentional movement of each cam member from the closed position to the open position, each said pivoting locking member comprising a front tip in engagement with said structure on said female conduit, a rear end, a protrusion for supporting one end of a biasing member, and a portion to accommodate said axle for said pivoting locking member to pivot about;

e) extending each said biasing member between each said pivoting locking member and each said cam member for biasing the pivoting locking member toward a clockwise direction about the axle of each said pivoting locking member; and f) providing a pull ring member attached directly to each said pivoting locking member through an opening in said rear end thereof for pulling and causing pivoting of said pivoting locking member and said front tip to disengage from said structure; and g) wherein when each said cam member is in the closed position, the inner lever portion is configured to mechanically cooperate with the structure on the female conduit and the outer lever portion is configured to mechanically cooperate with the inner lever portion to prevent unintentional movement of each said cam member from the closed position to the open position.

12. The method of claim 11, wherein when each said cam member is in the closed position, said front tip of the pivoting locking member of the inner lever portion is in engagement with the structure on the female conduit and said front tip of the pivoting locking member of the outer lever portion is configured to mechanically cooperate with a lip on a rear end of the inner lever portion to prevent unintentional movement of each said cam member from the closed position to the open position.

13. The method of claim 11, further comprising the step of actuating each said pull ring by an operator and mechanically cooperating with each said pivoting locking member to allow the operator to move the pivoting locking member for moving the cam members from the closed position to the open position.

14. The method of claim 13, wherein when the operator moves each said pull ring in a counterclockwise direction the rear end of the pivoting locking member is moved in a counterclockwise direction to move the cam members from the closed position to the open position.

15. The method of claim 11, further comprising the step of providing a housing disposed on each lever portion of the cam members so that there are four housings, wherein a single pivoting locking member is disposed inside a single housing.

16. The method of claim 15, wherein each housing comprises spaced members extending downwardly from outer edges of the cam members for protecting each pivoting locking member.

17. The method of claim 11, wherein the cam portions of the second cam members are forked, the forks having a space thereinbetween, wherein the cam portions of the first cam members are pivotally disposed in a respective space.

18. The method of claim 11, wherein a single cam portion is disposed on the first and second cam member, the single cam portion of the first and second cam members being disposed in side-by-side relation so that a face of the single cam portion of the first cam member is contiguous with a face of the single cam portion of the second cam member.

19. The method of claim 11, wherein at least a portion of the female conduit is rotatable about a centerline thereof.

20. The method of claim 11, further comprising the step of providing an air vent disposed in the wall of the female conduit.

* * * * *